United States Patent [19]

Nakai et al.

[11] Patent Number: 4,540,262

[45] Date of Patent: Sep. 10, 1985

[54] CAMERA ACCESSORY WITH DATA PRODUCER

[75] Inventors: Masaaki Nakai, Nara; Masayoshi Sahara, Sennan; Nobuyuki Taniguchi, Tondabayashi, all of Japan

[73] Assignee: Minolta Camera, Osaka, Japan

[21] Appl. No.: 472,133

[22] Filed: Mar. 4, 1983

[30] Foreign Application Priority Data

Mar. 5, 1982 [JP] Japan ............................ 57-35659
Mar. 17, 1982 [JP] Japan ......................... 57-37741[U]

[51] Int. Cl.³ ..................... G03B 17/18; G03B 17/56
[52] U.S. Cl. ............................. 354/195.13; 354/273; 354/286; 354/289.12; 354/295
[58] Field of Search ........... 354/471, 474, 475, 195.13, 354/273, 286, 289.1, 289.12, 295

[56] References Cited

U.S. PATENT DOCUMENTS

| | | | |
|---|---|---|---|
| 3,879,137 | 4/1975 | Sakazaki et al. | 354/60 X |
| 3,928,858 | 12/1975 | Sakurada et al. | 354/289.1 |
| 4,081,813 | 3/1978 | Kawamura et al. | 354/289.1 |
| 4,159,864 | 7/1979 | Yasukuni et al. | 350/184 |
| 4,286,849 | 9/1981 | Uchidoi et al. | 354/289.12 |
| 4,304,472 | 12/1981 | Shinoda et al. | 354/23 D |
| 4,329,040 | 5/1982 | Fukino et al. | 354/286 |
| 4,455,068 | 6/1984 | Izuhara | 354/289.12 X |

FOREIGN PATENT DOCUMENTS

| | | | |
|---|---|---|---|
| 2743779 | 4/1979 | Fed. Rep. of Germany | 354/289 |
| 48-11048 | 4/1973 | Japan | |
| 53-50420 | 12/1978 | Japan | |
| 54-108628 | 8/1979 | Japan | 354/289.12 |
| 54-147036 | 11/1979 | Japan | |
| 56-29220 | 3/1981 | Japan | |
| 56-135829 | 10/1981 | Japan | |
| 56-155908 | 12/1981 | Japan | |
| 57-5032 | 1/1982 | Japan | |
| 57-5033 | 1/1982 | Japan | |

Primary Examiner—William B. Perkey
Attorney, Agent, or Firm—Price, Gess & Ubell

[57] ABSTRACT

A camera accessory capable of transmitting data to a camera includes a ROM for storing various data at a plurality of addresses, respectively. The data includes a group of data related to the camera accessory and other groups of data which are not related to the camera accessory, but are related to other camera accessories, such that the ROM memorizes all the data of different kinds of camera accessories, and such data are divided into a number of groups, each group related to one kind of camera accessory. The camera accessory further includes a code signal producer which produces a code signal when an accessory is mounted on the camera so as to identify the type of the camera accessory, a receiver for receiving a digital signal from the camera, and a controller responsive to the code signal and the digital signal for controlling the data transmission from the camera accessory to the camera so that only the data of one group related to the particular camera accessory are transmitted to the camera.

20 Claims, 9 Drawing Figures

CAMERA ACCESSORY WITH DATA PRODUCER

BACKGROUND OF THE INVENTION

1. Field of the Invention

The present invention relates to a device for producing various data relating to camera accessories, such as interchangeable lenses, lens adaptors, and so on. More particularly, it relates to a device in which a fixed memory device stored with various data, such as a type of accessory, an aperture size, a focal length, and the like, is installed in a camera accessory, and such data are read out, when the camera accessory is attached to a camera body, in the camera.

2. Description of the Prior Art

It is known in the prior art, such as disclosed in Japanese Laid-Open Patent Application No. 54-108628, to provide a ROM (read-only-memory) in each camera accessory, such as in each interchangeable lens, to store various data, for example aperture size and focal length. When the lens is connected to the camera body, the ROM's address is sequentially specified to supply various data stored in ROM to the camera. According to this prior art, however, a ROM memorizes data only related to the accessory in which that ROM is employed and, therefore, for the different accessories it is necessary to provide ROMs stored with different data. Generally, the manufacturing cost of ROMs and its associated circuits (usually formed by an integrated circuit) is inversely proportional to the amount of manufactured pieces and, therefore, the lesser the number of ROMs to be manufactured, the higher the manufacturing cost for each ROM. Since the special use accessories, such as super telephoto lens and super wide-angle lens, are manufactured at a relatively low number, the ROMs and associated ICs to be installed in such special use accessories are very few in number Therefore, the manufacturing cost of such ROMs and ICs become very high, resulting in extra-high cost in manufacturing special use accessories. As apparent from the above, the prior art device has a disadvantage in creating a high manufacturing cost of data carrying camera accessories, particularly those manufactured at a low number.

SUMMARY OF THE INVENTION

The present invention has been developed with a view to substantially solving the above described disadvantage and has for its essential object to provide an improved a data carrying camera accessory which can be manufactured at low cost.

In accomplishing these and other objects, a camera accessory capable of transmitting data to a camera according to the present invention comprises a ROM for storing various data at a plurality of addresses, respectively. The data includes a group of data related to said camera accessory and other groups of data which are not related to said camera accessory, but are related to other camera accessories. In other words, the ROM memorizes all the data of different kinds of camera accessories, and such data are divided in to a number of groups, each group related to one kind of camera accessory.

The camera accessory according to the present invention further comprises means for providing a code signal which identifies a particular camera accessory, means for receiving a digital signal from the camera, and means responsive to the code signal and digital signal for controlling the data transmission from the camera accessory to the camera so that only the data of one group related to the particular camera accessory are transmitted to the camera.

According to the above arrangement, the ROM serves as a general element common to all kinds of camera accessories.

BRIEF DESCRIPTION OF THE DRAWINGS

These and other objects and features of the present invention will become apparent from the following description taken in conjunction with a preferred embodiment thereof with reference to the accompanying drawings, throughout wherein like parts are designated by like reference numerals, and in which.

DESCRIPTION OF THE PREFERRED EMBODIMENTS

Figure 1:
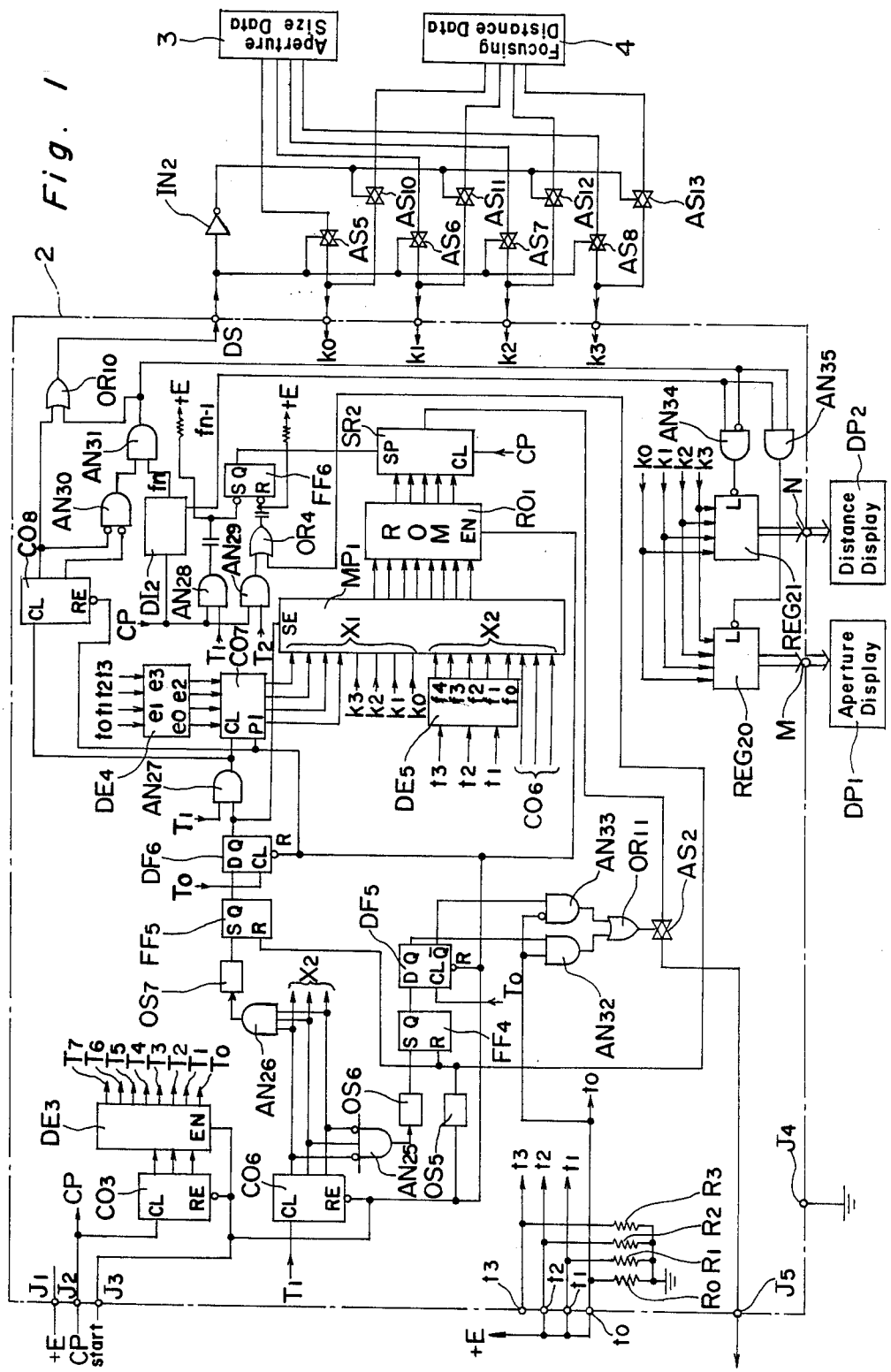
FIGS. 1 and 2 are circuit diagrams according to a preferred embodiment of the present invention, FIG. 1 showing a circuit portion to be installed in a camera accessory and FIG. 2 showing a circuit portion to be installed in a camera body.
Figure 2:
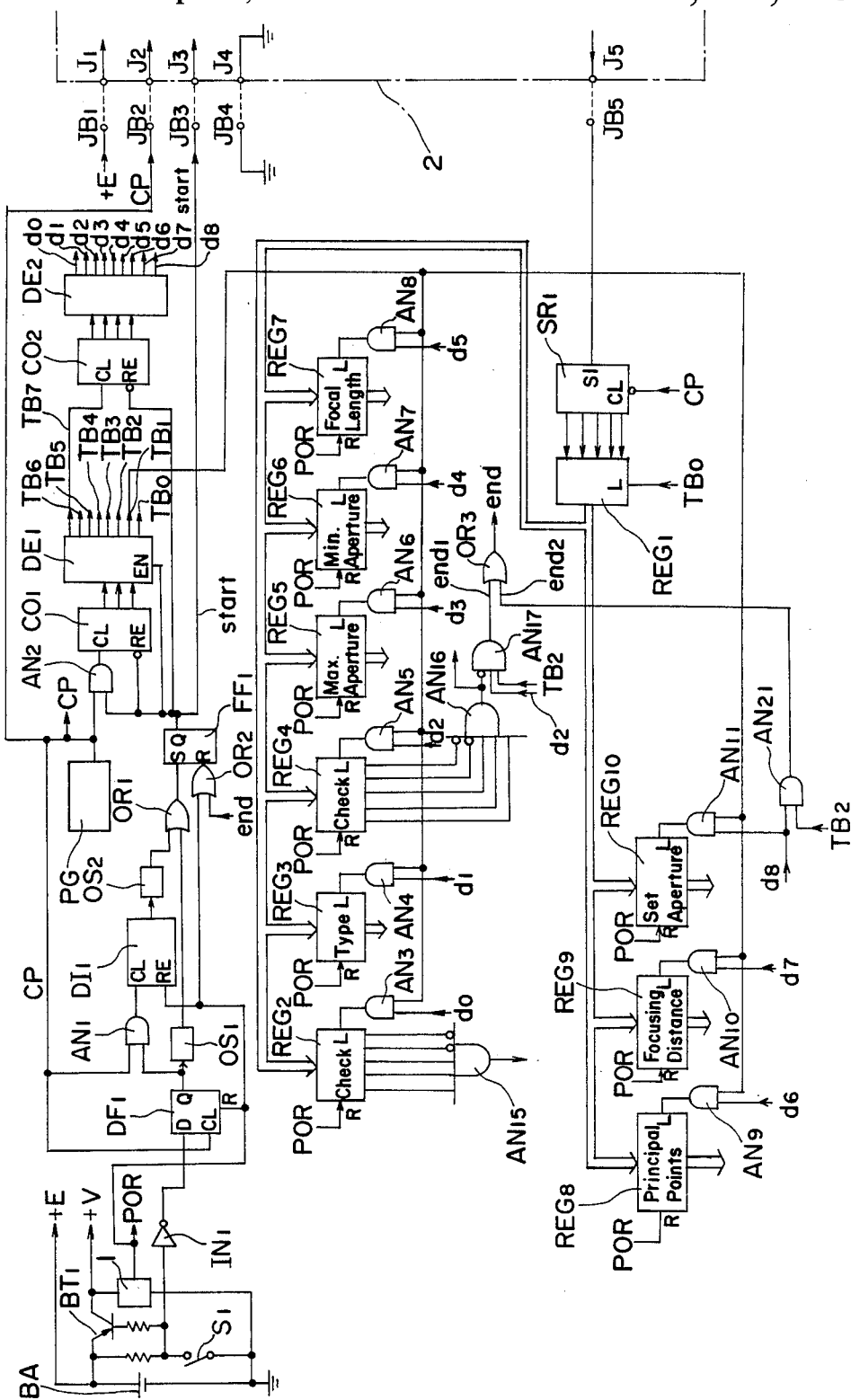

Referring to FIGS. 1 and 2, a data producing device according to the present invention is shown, and particularly, FIG. 1 shows a circuit part to be employed in a camera accessory and FIG. 2 shows a circuit part to be employed in a camera body. In FIG. 1, a circuit 2 enclosed by a chain line is formed by an IC (integrated circuit).

Before the detailed description of the present invention proceeds, it is to be noted that the term "camera accessory" means not only an interchangeable lens itself but also a lens adaptor which is mountable on the camera body together with the interchangeable lens. The lens adaptor includes bellows, reverse adaptor, teleconverter, extention tube, and the like. The circuit of FIG. 1 is particularly applicable to an interchangeable lens.

The IC 2 shown in FIG. 1 has five terminals J1 to J5 which are electrically connected to five terminals JB1 to JB2 of the circuit of FIG. 2, when the camera accessory is mounted on the camera body (not shown). As shown in FIG. 2, JB1 is an output terminal for producing electric power $+E$ from a power source provided in the camera body, JB2 is an output terminal for producing clock pulses CP, JB3 is an output terminal for producing a start signal by which the circuit of FIG. 1 starts data read out, JB4 is a ground terminal, and JB5 is an input terminal for receiving data read out from the circuit of FIG. 1.

The IC 2 further has four input terminals t0, t1, t2 and t3 which are connected to ground through resistors R0, R1, R2 and R3, respectively. The four input terminals t0 to t3 altogether produce a 4-bit signal representing a particular type of a camera accessory in a manner described below.

Each of the terminals t3 to t0 is selectively connectable to the power +E from the camera body, and when it is connected to the power +E it produces high, and when not, it produces low. The selection of which of the terminals t3 to t0 should be connected to the power +E is determined while manufacturing the camera accessory and, therefore, each type of camera accessory has a particular selection which is different from other types of camera accessories. Thus, when the camera accessory is mounted on the camera body, the selected terminals are connected to the power +E and the non-selected terminals are connected to ground. Therefore, the terminals t3 to t0 altogether produce a 4-bit signal of a particular combination which differs as the type of camera accessory differs. An example of 4-bit signals for various types of camera accessories is shown in Table 4. According to the circuit shown in FIG. 1, the terminal t3 is connected to ground and the terminals t2 to t0 are connected to the power +E and, therefore, a 4-bit signal "0111" is produced. Such a 4-bit signal "0111" indicates that, according to the Table 4, the mounted camera accessory is an interchangeable lens type IV.

The IC 2 still further has a terminal DS for producing a control signal which controls switches AS5 to AS8 and switches AS10 to AS13, terminals k0 to k3 for receiving data related to aperture size and amount of lens shift, and terminals M and N for supplying data to display devices DP1 and DP2, respectively. It is to be noted that the terminals DS, k0 to k3, M and N are not necessarily needed for those lens adaptors having no variable information, such as reverse adaptor, teleconverter, and the like. But for the lens adaptors with variable information, such as interchangeable lens, bellows that changes its length in a direction parallel to the optical axis, and the like, all or some of such terminals DS, k0 to k3, M and N are necessary.

The IC 2 includes a ROM (read only memory) RO1 which is previously stored with data of various accessories, and such data are divided into groups, each group containing particular data for a particular camera accessory.

The ROM RO1 is coupled with a multiplexer MP1 which produces an output signal for specifying an address in the ROM RO1. The stored data in the specified address are read out and transferred through shift register SR2 and switch AS2 to the output terminal J5, and further to the circuit (FIG. 2) provided in the camera body.

Next, a manner in which the data of various accessories are stored in the ROM RO1 is described. Table 1 shows an example of data stored in the ROM at different addresses and the meaning of each data when read in a camera body. Table 2 shows a relationship between the data to be stored in the ROM RO1 and the meaning of each data when read in a camera. As apparent from Table 1, data of 14 different camera accessories, i.e., 6 types of interchangeable lens I-VI and 8 types of lens adaptors I-VIII, are all stored in the ROM RO1 at respective regions, one region for one camera accessory. The data produced from the ROM RO1 is applied to one of the reading circuits provided in the camera body, and when it is read out by a particular reading circuit, it provides information, such as an F-stop number, focusing distance, focal length, type of lens accessory, and distance between principal points, as shown in Table 2, depending on which one of the reading circuits has been used for reading the data.

As understood from Table 1, the ROM's addresses are 8-bits long ($a_7\, a_6\, a_5\, a_4\, a_3\, a_2\, a_1\, a_0$), but for the sake of brevity, the address is sometimes indicated by the hexadecimal numbering system, as shown in parentheses in Table 1. In the address (0 0), no data is stored in ROM RO1. In the addresses (0 1) and (0 2), data concerning lens adaptor I are stored. Particularly, in the address (0 1), data "11100" meaning code for check is stored, and in the address (0 2), data "00001" meaning that the lens adaptor I is a bellows having a link mechanism for an auto-control of aperture is stored. Similarly, in the addresses (0 3) to (0 7), fixed data concerning interchangeable lens I are stored and, particularly: in the address (0 3), data "11100" meaning code for check is stored; in the address (0 4), data "00101" meaning that the maximum aperture size is F-stop 2.8 is stored; in the address (0 5), data "10001" meaning that the minimum aperture size is F-stop 22 is stored; in the address (0 6), data "00010" meaning that the focal length is 16 mm is stored; and in the address (0 7), data "10100" meaning that the distance between principal points is +45 mm is stored.

TABLE 1

| $a_7$ | $a_6$ | $a_5$ | $a_4$ | $a_3$ | $a_2$ | $a_1$ | $a_0$ | | Data in ROM | Meaning | Accessory Type |
|---|---|---|---|---|---|---|---|---|---|---|---|
| 0 | 0 | 0 | 0 | 0 | 0 | 0 | 0 | (0 0) | Blank | | |
| 0 | 0 | 0 | 0 | 0 | 0 | 0 | 1 | (0 1) | 1 1 1 0 0 | Code for Check | |
| 0 | 0 | 0 | 0 | 0 | 0 | 1 | 0 | (0 2) | 0 0 0 0 1 | Auto Bellows | Lens adaptor I |
| 0 | 0 | 0 | 0 | 0 | 0 | 1 | 1 | (0 3) | 1 1 1 0 0 | Code for Check | |
| 0 | 0 | 0 | 0 | 0 | 1 | 0 | 0 | (0 4) | 0 0 1 0 1 | F-stop 2.8 (Max.) | Interchangeable |
| 0 | 0 | 0 | 0 | 0 | 1 | 0 | 1 | (0 5) | 1 0 0 0 1 | F-stop 22 (Min.) | Lens I |
| 0 | 0 | 0 | 0 | 0 | 1 | 1 | 0 | (0 6) | 0 0 0 1 0 | f 16 mm | |
| 0 | 0 | 0 | 0 | 0 | 1 | 1 | 1 | (0 7) | 1 0 1 0 0 | * +45 mm | |
| 0 | 0 | 0 | 0 | 1 | 0 | 0 | 0 | (0 8) | Blank | | |
| 0 | 0 | 0 | 0 | 1 | 0 | 0 | 1 | (0 9) | 1 1 1 0 0 | Code for Check | |
| 0 | 0 | 0 | 0 | 1 | 0 | 1 | 0 | (0 A) | 0 0 0 1 0 | Auto rev. adap. | Lens adaptor II |
| 0 | 0 | 0 | 0 | 1 | 0 | 1 | 1 | (0 B) | 1 1 1 0 0 | Check Code | |
| 0 | 0 | 0 | 0 | 1 | 1 | 0 | 0 | (0 C) | 0 0 1 0 1 | F-stop 2.8 (Max.) | Interchangeable |
| 0 | 0 | 0 | 0 | 1 | 1 | 0 | 1 | (0 D) | 1 0 0 0 1 | F-stop 22 (Min.) | Lens II |
| 0 | 0 | 0 | 0 | 1 | 1 | 1 | 0 | (0 E) | 0 0 1 0 0 | f 20 mm | |
| 0 | 0 | 0 | 0 | 1 | 1 | 1 | 1 | (0 F) | 1 0 0 0 0 | * +34.6 mm | |
| 0 | 0 | 0 | 1 | 0 | 0 | 0 | 0 | (1 0) | 0 0 0 0 0 | ** 0.25 m | |
| 0 | 0 | 0 | 1 | 0 | 0 | 0 | 1 | (1 1) | 0 0 0 0 0 | ** 0.3 m | |
| 0 | 0 | 0 | 1 | 0 | 0 | 1 | 0 | (1 2) | 0 0 0 1 0 | ** 0.35 m | |
| 0 | 0 | 0 | 1 | 0 | 0 | 1 | 1 | (1 3) | 0 0 0 1 1 | ** 0.42 m | |

TABLE 1-continued

| Address | | | | | | | | Data in | | | Accessory |
|---|---|---|---|---|---|---|---|---|---|---|---|
| a7 | a6 | a5 | a4 | a3 | a2 | a1 | a0 | ROM | Meaning | | Type |
| 0 | 0 | 0 | 1 | 0 | 1 | 0 | 0 (1 4) | 0 0 1 0 0 | ** | 0.5 m | |
| 0 | 0 | 0 | 1 | 0 | 1 | 0 | 1 (1 5) | 0 0 1 0 1 | ** | 0.59 m | |
| 0 | 0 | 0 | 1 | 0 | 1 | 1 | 0 (1 6) | 0 0 1 1 0 | ** | 0.71 m | Interchangeable |
| 0 | 0 | 0 | 1 | 0 | 1 | 1 | 1 (1 7) | 0 0 1 1 1 | ** | 0.85 m | Lens I |
| 0 | 0 | 0 | 1 | 1 | 0 | 0 | 0 (1 8) | 0 1 0 0 0 | ** | 1.0 m | |
| 0 | 0 | 0 | 1 | 1 | 0 | 0 | 1 (1 9) | 0 1 0 0 1 | ** | 1.2 m | |
| 0 | 0 | 0 | 1 | 1 | 0 | 1 | 0 (1 A) | 0 1 0 1 0 | ** | 1.4 m | |
| 0 | 0 | 0 | 1 | 1 | 0 | 1 | 1 (1 B) | 0 1 1 0 0 | ** | 2.0 m | |
| 0 | 0 | 0 | 1 | 1 | 1 | 0 | 0 (1 C) | 0 1 1 1 0 | ** | 2.8 m | |
| 0 | 0 | 0 | 1 | 1 | 1 | 0 | 1 (1 D) | 1 0 0 0 0 | ** | 4.0 m | |
| 0 | 0 | 0 | 1 | 1 | 1 | 1 | 0 (1 E) | 1 0 0 1 0 | ** | 5.6 m | |
| 0 | 0 | 0 | 1 | 1 | 1 | 1 | 1 (1 F) | 1 1 1 1 1 | ** | ∞ m | |
| 0 | 0 | 1 | 0 | 0 | 0 | 0 | 0 (2 0) | 0 0 1 0 1 | F-stop | 2.8 | |
| 0 | 0 | 1 | 0 | 0 | 0 | 0 | 1 (2 1) | 0 0 1 1 0 | F-stop | 3.5 | |
| 0 | 0 | 1 | 0 | 0 | 0 | 1 | 0 (2 2) | 0 0 1 1 1 | F-stop | 4 | |
| 0 | 0 | 1 | 0 | 0 | 0 | 1 | 1 (2 3) | 0 1 0 0 0 | F-stop | 4.5 | |
| 0 | 0 | 1 | 0 | 0 | 1 | 0 | 0 (2 4) | 0 1 0 0 1 | F-stop | 5.6 | |
| 0 | 0 | 1 | 0 | 0 | 1 | 0 | 1 (2 5) | 0 1 0 1 0 | F-stop | 6.7 | |
| 0 | 0 | 1 | 0 | 0 | 1 | 1 | 0 (2 6) | 0 1 0 1 1 | F-stop | 8 | Interchangeable |
| 0 | 0 | 1 | 0 | 0 | 1 | 1 | 1 (2 7) | 0 1 1 0 0 | F-stop | 9.5 | Lens I |
| 0 | 0 | 1 | 0 | 1 | 0 | 0 | 0 (2 8) | 0 1 1 0 1 | F-stop | 11 | |
| 0 | 0 | 1 | 0 | 1 | 0 | 0 | 1 (2 9) | 0 1 1 1 0 | F-stop | 13 | |
| 0 | 0 | 1 | 0 | 1 | 0 | 1 | 0 (2 A) | 0 1 1 1 1 | F-stop | 16 | |
| 0 | 0 | 1 | 0 | 1 | 0 | 1 | 1 (2 B) | 1 0 0 0 0 | F-stop | 19 | |
| 0 | 0 | 1 | 0 | 1 | 1 | 0 | 0 (2 C) | 1 0 0 0 1 | F-stop | 22 | |
| 0 | 0 | 1 | 0 | 1 | 1 | 0 | 1 (2 D) | 1 0 0 0 1 | F-stop | 22 | |
| 0 | 0 | 1 | 0 | 1 | 1 | 1 | 0 (2 E) | 1 0 0 0 1 | F-stop | 22 | |
| 0 | 0 | 1 | 0 | 1 | 1 | 1 | 1 (2 F) | 1 0 0 0 1 | F-stop | 22 | |
| 0 | 0 | 1 | 1 | 0 | 0 | 0 | 0 (3 0) | 0 0 0 0 0 | ** | 0.25 m | |
| 0 | 0 | 1 | 1 | 0 | 0 | 0 | 1 (3 1) | 0 0 0 1 0 | ** | 0.35 m | |
| 0 | 0 | 1 | 1 | 0 | 0 | 1 | 0 (3 2) | 0 0 1 0 0 | ** | 0.5 m | |
| 0 | 0 | 1 | 1 | 0 | 0 | 1 | 1 (3 3) | 0 0 1 1 0 | ** | 0.71 m | |
| 0 | 0 | 1 | 1 | 0 | 1 | 0 | 0 (3 4) | 0 1 0 0 0 | ** | 1.0 m | |
| 0 | 0 | 1 | 1 | 0 | 1 | 0 | 1 (3 5) | 0 1 0 1 0 | ** | 1.4 m | |
| 0 | 0 | 1 | 1 | 0 | 1 | 1 | 0 (3 6) | 0 1 1 0 0 | ** | 2.0 m | Interchangeable |
| 0 | 0 | 1 | 1 | 0 | 1 | 1 | 1 (3 7) | 0 1 1 1 0 | ** | 2.8 m | Lens II |
| 0 | 0 | 1 | 1 | 1 | 0 | 0 | 0 (3 8) | 1 0 0 0 0 | ** | 4.0 m | |
| 0 | 0 | 1 | 1 | 1 | 0 | 0 | 1 (3 9) | 1 0 0 1 0 | ** | 5.6 m | |
| 0 | 0 | 1 | 1 | 1 | 0 | 1 | 0 (3 A) | 1 0 1 0 0 | ** | 8.0 m | |
| 0 | 0 | 1 | 1 | 1 | 0 | 1 | 1 (3 B) | 1 0 1 1 0 | ** | 11.0 m | |
| 0 | 0 | 1 | 1 | 1 | 1 | 0 | 0 (3 C) | 1 1 1 1 1 | ** | ∞ m | |
| 0 | 0 | 1 | 1 | 1 | 1 | 0 | 1 (3 D) | 1 1 1 1 1 | ** | ∞ m | |
| 0 | 0 | 1 | 1 | 1 | 1 | 1 | 0 (3 E) | 1 1 1 1 1 | ** | ∞ m | |
| 0 | 0 | 1 | 1 | 1 | 1 | 1 | 1 (3 F) | 1 1 1 1 1 | ** | ∞ m | |
| 0 | 1 | 0 | 0 | 0 | 0 | 0 | 0 (4 0) | 0 0 1 0 1 | F-stop 2.8 | | Interchangeable Lens II |
| . | | . | | . | | . | . | . | . | | |
| 0 | 1 | 0 | 0 | 1 | 1 | 1 | 1 (4 F) | 1 0 0 0 1 | F-stop 22 | | |
| 0 | 1 | 0 | 1 | 0 | 0 | 0 | 0 (5 0) | Blank | | | |
| 0 | 1 | 0 | 1 | 0 | 0 | 0 | 1 (5 1) | (Data of adaptor particulars | | | Lens Adaptor III |
| 0 | 1 | 0 | 1 | 0 | 0 | 1 | 0 (5 2) | omitted) | | | |
| 0 | 1 | 0 | 1 | 0 | 0 | 1 | 1 (5 3) | (Data of lens particulars | | | Interchangeable |
| 0 | 1 | 0 | 1 | 0 | 1 | 0 | 0 (5 4) | omitted | | | Lens III |
| 0 | 1 | 0 | 1 | 0 | 1 | 0 | 1 (5 5) | | | | |
| 0 | 1 | 0 | 1 | 0 | 1 | 1 | 0 (5 6) | | | | |
| 0 | 1 | 0 | 1 | 0 | 1 | 1 | 1 (5 7) | | | | |
| 0 | 1 | 0 | 1 | 1 | 0 | 0 | 0 (5 8) | Blank | | | |
| 0 | 1 | 0 | 1 | 1 | 0 | 0 | 1 (5 9) | (Data of adaptor particulars | | | Lens Adaptor IV |
| 0 | 1 | 0 | 1 | 1 | 0 | 1 | 0 (5 A) | omitted) | | | |
| 0 | 1 | 0 | 1 | 1 | 0 | 1 | 1 (5 B) | (Data of lens particulars | | | Interchangeable |
| 0 | 1 | 0 | 1 | 1 | 1 | 0 | 0 (5 C) | omitted) | | | Lens IV |
| 0 | 1 | 0 | 1 | 1 | 1 | 0 | 1 (5 D) | | | | |
| 0 | 1 | 0 | 1 | 1 | 1 | 1 | 0 (5 E) | | | | |
| 0 | 1 | 0 | 1 | 1 | 1 | 1 | 1 (5 F) | | | | |
| 0 | 1 | 1 | 0 | 0 | 0 | 0 | 0 (6 0) | (Data of lens positions omitted) | | | Interchangeable Lens III |
| . | | . | | . | | . | . | . | | | |
| 0 | 1 | 1 | 0 | 1 | 1 | 1 | 1 (6 F) | | | | |
| 0 | 1 | 1 | 1 | 0 | 0 | 0 | 0 (7 0) | (Data of aperture sizes omitted) | | | Interchangeable Lens III |
| . | | . | | . | | . | . | . | | | |
| 0 | 1 | 1 | 1 | 1 | 1 | 1 | 1 (7 F) | | | | |
| 1 | 0 | 0 | 0 | 0 | 0 | 0 | 0 (8 0) | (Data of lens position omitted) | | | Interchangeable Lens IV |
| . | | . | | . | | . | . | . | | | |
| 1 | 0 | 0 | 0 | 1 | 1 | 1 | 1 (8 F) | | | | |

TABLE 1-continued

| Address | | | | | | | | Data in | | Accessory |
|---|---|---|---|---|---|---|---|---|---|---|
| $a_7$ | $a_6$ | $a_5$ | $a_4$ | $a_3$ | $a_2$ | $a_1$ | $a_0$ | ROM | Meaning | Type |
| 1 | 0 | 0 | 1 | 0 | 0 | 0 | 0 | (9 0) | (Data of aperture size omitted) | Interchangeable Lens IV |
| . | | . | | . | | | | . | | |
| 1 | 0 | 0 | 1 | 1 | 1 | 1 | 1 | (9 F) | Blank | |
| 1 | 0 | 1 | 0 | 0 | 0 | 0 | 0 | (A 0) | | |
| 1 | 0 | 1 | 0 | 0 | 0 | 0 | 1 | (A 1) | (Data of adaptor particulars omitted) | Lens Adaptor V |
| 1 | 0 | 1 | 0 | 0 | 0 | 1 | 0 | (A 2) | | |
| 1 | 0 | 1 | 0 | 0 | 0 | 1 | 1 | (A 3) | (Data of lens particulars omitted) | Interchangeable Lens V |
| 1 | 0 | 1 | 0 | 0 | 1 | 0 | 0 | (A 4) | | |
| 1 | 0 | 1 | 0 | 0 | 1 | 0 | 1 | (A 5) | | |
| 1 | 0 | 1 | 0 | 0 | 1 | 1 | 0 | (A 6) | | |
| 1 | 0 | 1 | 0 | 0 | 1 | 1 | 1 | (A 7) | | |
| 1 | 0 | 1 | 0 | 1 | 0 | 0 | 0 | (A 8) | Blank | |
| 1 | 0 | 1 | 0 | 1 | 0 | 0 | 1 | (A 9) | (Data of adaptor particulars omitted) | Lens Adaptor VI |
| 1 | 0 | 1 | 0 | 1 | 0 | 1 | 0 | (A A) | | |
| 1 | 0 | 1 | 0 | 1 | 0 | 1 | 1 | (A B) | (Data of lens particulars omitted) | Interchangeable Lens VI |
| 1 | 0 | 1 | 0 | 1 | 1 | 0 | 0 | (A C) | | |
| 1 | 0 | 1 | 0 | 1 | 1 | 0 | 1 | (A D) | | |
| 1 | 0 | 1 | 0 | 1 | 1 | 1 | 0 | (A E) | | |
| 1 | 0 | 1 | 0 | 1 | 1 | 1 | 1 | (A F) | | |
| 1 | 0 | 1 | 1 | 0 | 0 | 0 | 0 | (B 0) | (Data of lens positions omitted) | Interchangeable Lens V |
| . | | | | . | | | | . | | |
| 1 | 0 | 1 | 1 | 1 | 1 | 1 | 1 | (B F) | | |
| 1 | 1 | 0 | 0 | 0 | 0 | 0 | 0 | (C 0) | (Data of aperture size omitted) | Interchangeable Lens V |
| . | | | | . | | | | . | | |
| 1 | 1 | 0 | 0 | 1 | 1 | 1 | 1 | (C F) | | |
| 1 | 1 | 0 | 1 | 0 | 0 | 0 | 0 | (D 0) | (Data of lens positions omitted) | Interchangeable Lens VI |
| . | | | | . | | | | . | | |
| 1 | 1 | 0 | 1 | 1 | 1 | 1 | 1 | (D F) | | |
| 1 | 1 | 1 | 0 | 0 | 0 | 0 | 0 | (E 0) | (Data of aperture size omitted) | Interchangeable Lens VI |
| . | | | | . | | | | . | | |
| 1 | 1 | 1 | 0 | 1 | 1 | 1 | 1 | (E F) | | |
| 1 | 1 | 1 | 1 | 0 | 0 | 0 | 0 | (F 0) | Blank | |
| 1 | 1 | 1 | 1 | 0 | 0 | 0 | 1 | (F 1) | (Data of adaptor particulars omitted) | Lens Adaptor VII |
| 1 | 1 | 1 | 1 | 0 | 0 | 1 | 0 | (F 2) | | |
| 1 | 1 | 1 | 1 | 0 | 0 | 1 | 1 | (F 3) | Blank | |
| 1 | 1 | 1 | 1 | 0 | 1 | 0 | 0 | (F 4) | " | |
| 1 | 1 | 1 | 1 | 0 | 1 | 0 | 1 | (F 5) | " | |
| 1 | 1 | 1 | 1 | 0 | 1 | 1 | 0 | (F 6) | " | |
| 1 | 1 | 1 | 1 | 0 | 1 | 1 | 1 | (F 7) | " | |
| 1 | 1 | 1 | 1 | 1 | 0 | 0 | 0 | (F 8) | " | |
| 1 | 1 | 1 | 1 | 1 | 0 | 0 | 1 | (F 9) | (Data of adaptor particulars omitted) | Lens Adaptor VIII |
| 1 | 1 | 1 | 1 | 1 | 0 | 1 | 0 | (F A) | | |
| 1 | 1 | 1 | 1 | 1 | 0 | 1 | 1 | (F B) | Blank | |
| 1 | 1 | 1 | 1 | 1 | 1 | 0 | 0 | (F C) | " | |
| 1 | 1 | 1 | 1 | 1 | 1 | 0 | 1 | (F D) | " | |
| 1 | 1 | 1 | 1 | 1 | 1 | 1 | 0 | (F E) | " | |
| 1 | 1 | 1 | 1 | 1 | 1 | 1 | 1 | (F F) | " | |

Note:
"f" stands for focal length.
"*" stands for distance between principal points.
"**" stands for focusing distance.

TABLE 2

| Data Code | F-stop Number | Focusing Distance | Focal Length | Accessory Name | Distance Between Principal Points |
|---|---|---|---|---|---|
| 0 0 0 0 0 | 1.2 | 0.25 m | below 8 mm | | −14.3 mm |
| 0 0 0 0 1 | 1.4 | 0.3 | 12.5 | bellows A | −13.2 |
| 0 0 0 1 0 | 1.7 | 0.35 | 16 | rev. adap. A | −9.05 |
| 0 0 0 1 1 | 2 | 0.42 | 18 | teleconverter A | −8.11 |
| 0 0 1 0 0 | 2.5 | 0.5 | 20 | extension ring A | −7.30 |
| 0 0 1 0 1 | 2.8 | 0.59 | 24 | | −6.00 |
| 0 0 1 1 0 | 3.5 | 0.71 | 25 | | −3.21 |
| 0 0 1 1 1 | 4 | 0.85 | 28 | | −2.80 |
| 0 1 0 0 0 | 4.5 | 1 | 30 | | +0.70 |
| 0 1 0 0 1 | 5.6 | 1.2 | 35 | bellows M | +2.05 |
| 0 1 0 1 0 | 6.7 | 1.4 | 40 | rev. adap. M | +14.9 |
| 0 1 0 1 1 | 8 | 1.7 | 45 | teleconverter M | +19.4 |
| 0 1 1 0 0 | 9.5 | 2 | 50 | extension ring M | +20.5 |

TABLE 2-continued

| Data Code | F-stop Number | Focusing Distance | Focal Length | Accessory Name | Distance Between Principal Points |
|---|---|---|---|---|---|
| 0 1 1 0 1 | 11 | 2.5 | 55 | | +20.8 |
| 0 1 1 1 0 | 13 | 2.8 | 60 | | +24.8 |
| 0 1 1 1 1 | 16 | 3.5 | 70 | | +26.5 |
| 1 0 0 0 0 | 19 | 4 | 75 | | +32.5 |
| 1 0 0 0 1 | 22 | 4.5 | 85 | | +34.6 |
| 1 0 0 1 0 | 27 | 5.6 | 100 | | +36.7 |
| 1 0 0 1 1 | 32 | 6.7 | 120 | | +44.6 |
| 1 0 1 0 0 | 1.8 | 8 | 135 | | +45.0 |
| 1 0 1 0 1 | 1.9 | 9.5 | 180 | | +73.0 |
| 1 0 1 1 0 | 3.3 | 11 | 200 | | +76.6 |
| 1 0 1 1 1 | 3.6 | 13 | 250 | | +95.6 |
| 1 1 0 0 0 | 3.8 | 16 | 300 | | +207 |
| 1 1 0 0 1 | 4.2 | 19 | 360 | | +211 |
| 1 1 0 1 0 | 4.3 | 22 | 400 | | +270 |
| 1 1 0 1 1 | 5 | 27 | 500 | | +309 |
| 1 1 1 0 0 | 6.3 | 32 | 600 | (check code) | +490 |
| 1 1 1 0 1 | 6.5 | 40 | 800 | | |
| 1 1 1 1 0 | 6.9 | 45 | above 1000 | | no data |
| 1 1 1 1 1 | | ∞ | fixed | | |

Then, in the address (0 8), no data is stored. In the addresses (0 9) and (0 A), data concerning lens adaptor II are stored. Particularly, in the address (0 9), data "11100" meaning code for check is stored, and in the address (0 A), data "00010" meaning that the lens adaptor II is a reverse adaptor having an auto-control aperture is stored. In the addresses (0 B) to (0 F), fixed data concerning interchangeable lens II are stored and, particularly: in the address (0 B), data "11100" meaning code for check is stored; in the address (0 C), data "00101" meaning that the maximum aperture size is F-stop 2.8 is stored; in the address (0 D), data "10001" meaning that the minimum aperture size is F-stop 22 is stored; in the address (0 E), data "00010" meaning that the focal length is 20 mm is stored; and in the address (0 F), data "10001" meaning that the distance between principal points is +34.6 mm is stored. In the addresses (1 0) to (1 F), data concerning focusing distances of the interchangeable lens I covering from the most near focusing distance 0.25 m to the infinite focusing distance, as shown in Table 1, are stored.

Although the data stored in ROM RO1, e.g., at the addresses (0 6), (0 A) and (1 2) are all "00010", their meanings are different, because they are read out at difference sequences and are applied to different reading circuits in the camera body, as will become apparent from the description given later.

In the addresses (2 0) to (2 F), data concerning aperture sizes of the interchangeable lens I from the maximum (F-stop 2.8) to the minimum (F-stop 22) in steps as obtained by the turning of an aperture control ring, as shown in Table 1, are stored. Similarly, in the addresses (3 0) to (3 F), data relative to the amount of lens shift for focusing and thus relative to the focusing distances of the interchangeable lens II are stored, and in the addresses (4 0) to (4 F), data concerning aperture sizes of the interchangeable lens II are stored.

Likewise, the ROM RO1 is stored with data of other lens accessories. In the address (5 0), no data is stored, but in the addresses (5 1) and (5 2), fixed data concerning another lens adaptor III are stored, and in the addresses (5 3) to (5 7), data concerning another interchangeable lens III are stored. The address (5 8) remains blank, and in the addresses (5 9) and (5 A), data concerning lens adaptor IV are stored. In the addresses (5 B) to (5 F), fixed data concerning interchangeable lens IV are stored. In the addresses (6 0) to (6 F), data concerning focusing distances of the interchangeable lens III are stored, and in the addresses (7 0) to (7 F), data concerning aperture sizes of the interchangeable lens III are stored. In the addresses (8 0) to (8 F), data concerning focusing distances of the interchangeable lens IV are stored, and in the addresses (9 0) to (9 F), data concerning aperture sizes of the interchangeable lens IV are stored. In this manner, the ROM RO1 is further stored with data concerning lens adaptors V, VI, VII and VIII and interchangeable lenses V and VI, as shown in Table 1.

Next, the circuit of FIG. 1 is described in detail. When a lens accessory, which may be an interchangeable lens or a lens adaptor provided with the IC 2, is mounted on a camera body, the terminals J1, J2, J3, J4 and J5 of the IC 2 are respectively connected with the terminals JB1, JB2, JB3, JB4 and JB5 of the camera body. Thus, the terminal J1 is connected to a source of electric power +E provided in the camera body through the terminal JB1, and the terminal J2 is connected to a pulse generator PG provided in the camera body through the terminal JB2 for receiving a train of clock pulses CP. The terminal J3 is connected to a Q-terminal of a flip-flop FF1 provided in the camera body through the terminal JB3 for receiving a start signal that initiates the data reading from the interchangeable lens or lens adaptor to the camera body. The terminal J4 is grounded, and the terminal J5 is connected to a shift register SR1 provided in the camera body through the terminal JB5 for transmitting the data of the interchangeable lens or lens adaptor to the shift register SR1.

FIG. 2 shows a circuit provided in the camera body for providing electric power +E, clock pulses CP and a start signal to the IC 2. In FIG. 2, BA designates a battery which provides the power +E. When a light measuring switch S1 closes, a transistor BT1 turns to a conductive state for supplying a voltage +V to a light measuring circuit (not shown). Furthermore, upon closure of the light measuring switch S1, a power-on-reset circuit 1 is actuated to produce a power-on-reset signal POR. The power-on-reset signal POR is applied to a reset terminal of each of flip-flop FF1, D flip-flop DF1, divider DI1, registers REG2, REG3, . . . , REG10 for the initial reset of these circuits, and is also applied to one input of an OR gate OR2.

The light measuring switch S1 is connected to an inverter IN1 and, in turn, to a D-terminal of the D flip-flop DF1. The D flip-flop DF1 has a Q-terminal which is connected to one input of an AND gate AN1 and also to an input terminal of a one-shot circuit OS1. The other input terminal of the AND gate AN1 is connected to a pulse generator PG which produces a train of clock pulses. The output terminal of the AND gate AN1 is connected to the divider DI1. The output of the divider DI1 is connected to an input terminal of a one-shot circuit OS2, and an output of the one-shot circuit OS2 is connected to one input of an OR gate OR1. The other input of the OR gate OR1 is connected to the output of the one-shot circuit OS1, and the output of the OR gate OR1 is connected to the set terminal of the flip-flop FF1. From the Q-terminal of the flip-flop FF1, the start signal is produced. The Q-terminal of the flip-flop FF1 is connected to each of one input of an AND gate AN2, reset terminals of counters CO1 and C02, and enable terminal EN of a decoder DE1. The AND gate AN2 has its other input connected to the pulse generator PG for receiving clock pulses CP, and its output connected to clock terminal of the counter CO1. The counter CO1 has 3 output terminals for producing a 3-bit signal, and these 3 output terminals are connected to 3 input terminals of the decoder DE1.

When the power-on-reset circuit 1 produces the power-on-reset signal POR in response to the closure of the light measuring switch S1, the flip-flop FF1 turns to a set condition to generate the start signal. Upon receipt of the start signal, the counter CO1 starts to count clock pulses CP obtained from the pulse generator PG through the AND gate AN2. And, in response to the output signal from the counter CO1, the decoder DE1 sequentially produces timing pulses from its terminals TB0, TB1, ..., TB7. A relationship between the signals produced from the counter CO1 and the timing signals produced from the decoder DE1 is shown in Table 3 below.

TABLE 3

| Counter | Decoder DE1 or DE3 | | | | | | | |
|---------|-----|-----|-----|-----|-----|-----|-----|-----|
| CO1 or CO3 | TB0 | TB1 | TB2 | TB3 | TB4 | TB5 | TB6 | TB7 |
| 0 0 0 | H | L | L | L | L | L | L | L |
| 0 0 1 | L | H | L | L | L | L | L | L |
| 0 1 0 | L | L | H | L | L | L | L | L |
| 0 1 1 | L | L | L | H | L | L | L | L |
| 1 0 0 | L | L | L | L | H | L | L | L |
| 1 0 1 | L | L | L | L | L | H | L | L |
| 1 1 0 | L | L | L | L | L | L | H | L |
| 1 1 1 | L | L | L | L | L | L | L | H |

The Q-terminal of the flip-flop FF1, which produces the start signal, is also connected to the terminal JB3 and further to, when an interchangeable lens or lens adaptor is mounted on the camera body, the terminal J3 of the IC 2. As shown in FIG. 1, the terminal J3 is connected to a reset terminal of each of counters C03, C06 and C08, and D flip-flops DF5 and DF6. The terminal J3 is further connected to an enable terminal of a decoder DE3, an input terminal of one-shot circuit OS5, a preset terminal of a preset counter C07 and an enable terminal of the ROM RO1. The terminal J2, which receives clock pulses CP from the pulse generator PG (FIG. 2) provided in the camera body, is connected to a clock terminal of the counter C03. The counter C03 has 3 output terminals for producing a 3-bit signal which is applied to 3 input terminals of the decoder DE3.

When the start signal is applied through the terminal J3 to the reset terminal of the counter C03 and also to the enable terminal of the decoder DE3, the counter C03 starts to count the clock pulses CP from the terminal J2. And, in response to the output signal from the counter C03, the decoder DE3 sequentially produces timing pulses from its terminals T0, T1, ..., T7. A relationship between the signals produced from the counter C03 and the timing signals produced from the decoder DE3 is the same as that shown in Table 3, i.e., the relationship between the signals produced from the counter CO1 and the timing signals produced from the decoder DE1. Thus, the timing pulses from the decoder DE1 and those from the decoder DE3 are synchronized with each other. Since the circuit (FIG. 2) in the camera body and the circuit (FIG. 1) in the interchangeable lens or lens adaptor are actuated by the respective timing pulses, their operations are synchronized with each other.

The output terminal T1 of the decoder DE3 is connected to a clock terminal of the counter C06, and 3 output terminals of the counter C06 producing a 3-bit signal is connected to a data input terminal X2 of a multiplexer MP1 at the least significant 3 bit input terminals. The remaining or the most significant 5 bit input terminals of the data input terminal X2 of the multiplexer MP1 are connected to 5 output terminals f0, f1, f2, f3 and f4 of a decoder DE5. The decoder DE5 has 3 input terminals which are connected to the terminals t1, t2 and t3. Thus, the decoder DE5 receives a 3-bit signal representing the type of interchangeable lens or lens adaptor mounted on the camera body, and converts such a 3-bit signal to a 5-bit signal, as shown in Table 4 below, for specifying the regions in the ROM RO1 where various fixed data of interchangeable lenses and fixed data of lens adaptors shown in Table 1 are stored.

TABLE 4

| Terminals | | | | Type of Accessory | Decoder DE4 | | | | Decoder DE5 | | | | |
|----|----|----|----|----|----|----|----|----|----|----|----|----|----|
| t3 | t2 | t1 | t0 | | e3 | e2 | e1 | e0 | f4 | f3 | f2 | f1 | f0 |
| 0 | 0 | 0 | 0 | Lens Adaptor I | ∅ | ∅ | ∅ | ∅ | 0 | 0 | 0 | 0 | 0 |
| 0 | 0 | 0 | 1 | Interchangeable Lens I | 0 | 0 | 0 | 0 | 0 | 0 | 0 | 0 | 0 |
| 0 | 0 | 1 | 0 | Lens Adaptor II | ∅ | ∅ | ∅ | ∅ | 0 | 0 | 0 | 0 | 1 |
| 0 | 0 | 1 | 1 | Interchangeable Lens II | 0 | 0 | 1 | 0 | 0 | 0 | 0 | 0 | 1 |
| 0 | 1 | 0 | 0 | Lens Adaptor III | ∅ | ∅ | ∅ | ∅ | 0 | 1 | 0 | 1 | 0 |
| 0 | 1 | 0 | 1 | Interchangeable Lens III | 0 | 1 | 0 | 1 | 0 | 1 | 0 | 1 | 0 |
| 0 | 1 | 1 | 0 | Lens Adaptor IV | ∅ | ∅ | ∅ | ∅ | 0 | 1 | 0 | 1 | 1 |
| 0 | 1 | 1 | 1 | Interchangeable Lens IV | 0 | 1 | 1 | 1 | 0 | 1 | 0 | 1 | 1 |
| 1 | 0 | 0 | 0 | Lens Adaptor V | ∅ | ∅ | ∅ | ∅ | 1 | 0 | 1 | 0 | 0 |
| 1 | 0 | 0 | 1 | Interchangeable Lens V | 1 | 0 | 1 | 0 | 1 | 0 | 1 | 0 | 0 |

TABLE 4-continued

| Terminals | | | | Type of Accessory | Decoder DE4 | | | | Decoder DE5 | | | | |
|---|---|---|---|---|---|---|---|---|---|---|---|---|---|
| t3 | t2 | t1 | t0 | | e3 | e2 | e1 | e0 | f4 | f3 | f2 | f1 | f0 |
| 1 | 0 | 1 | 0 | Lens Adaptor VI | ϕ | ϕ | ϕ | ϕ | 1 | 0 | 1 | 0 | 1 |
| 1 | 0 | 1 | 1 | Interchangeable Lens VI | 1 | 1 | 0 | 0 | 1 | 0 | 1 | 0 | 1 |
| 1 | 1 | 0 | 0 | Lens Adaptor VII | ϕ | ϕ | ϕ | ϕ | 1 | 1 | 1 | 1 | 0 |
| 1 | 1 | 1 | 0 | Lens Adaptor VIII | ϕ | ϕ | ϕ | ϕ | 1 | 1 | 1 | 1 | 1 |

Note: ϕ can be either "0" or "1" since it is not related in operation.

The 3-bit signal applied to the data input terminal X2 of the multiplexer MP1 at the least significant 3 bit input terminals is used for specifying a location in the above-mentioned region where a data representing a particular interchangeable lens or lens adaptor, as shown in Table 1, is stored. Therefore, the 8-bit signal applied to the data input terminal X2 of the multiplexer MP1 serves as and address for specifying a particular interchangeable lens or lens adaptor as memorized in the ROM RO1, as indicated in Table 1.

The 3 output terminals of the counter C06 are also connected to 3 inputs of an AND gate AN26, and an output terminal of the AND gate AN26 is connected to a one-shot circuit OS7. The one-shot circuit OS7 has an output terminal which is connected to a set terminal of a flip-flop FF5, and a Q-terminal of the flip-flop FF5 is connected to a D-terminal of a D flip-flop DF6. A Q-terminal of the D flip-flop DF6 is connected to one input of an AND gate AN27, and also to a selection terminal SE of the multiplexer MP1. When the multiplexer MP1 receives a low level signal to a its selection terminal SE, it selects and produces an 8-bit signal from the data input terminal X2, and when it receives a high level signal, it selects and produces an 8-bit signal from the data input terminal X1. The flip-flop FF5 has a reset terminal which is connected to an output of the one-shot circuit OS5, and the D flip-flop DF6 has a clock terminal which is connected to the terminal T0 of the decoder DE3. The other input of the AND gate AN27 is connected to the terminal T1 of the decoder DE3, and the output of the AND gate AN27 is connected to clock terminal of each of preset counter C07 and counter C08. The preset counter C07 has 4 inputs for receiving a 4-bit signal from a decoder DE4, and the decoder DE4 has 4 inputs for receiving a 4-bit signal from the terminals t0, t1, t2 and t3. In response to the 4-bit signal from the terminals t3 to t0, the decoder DE4 produces a 4-bit signal, as shown in Table 4, from its outputs e3, e2, e1 and e0. In Table 4, "ϕϕϕϕ" can be any combination of high and low level signals, since such a 4-bit signal shown by "ϕϕϕϕ" has no effect in the operation of the circuit shown. The 4 outputs of the counter C07 are connected to a data input terminal X1 of the multiplexer MP1 at the most significant 4 bit input terminals.

The remaining, or the least significant 4 bit, input terminals of the data input terminal X1 of the multiplexer MP1 are connected to the terminals k0, k1, k2 and k3 of the IC 2. The terminal k0 is connected to an output of each of the analog switches AS5 and AS10, which are provided externally of the IC 2. In a similar manner, the terminals k1, k2 and k3 are connected to outputs of analog switches AS6 and AS11, analog switches AS7 and AS12, and analog switches AS8 and AS13, respectively. The inputs of the analog switches AS5, AS6, AS7 and AS8 are connected, respectively, to 4 outputs of an aperture size data producing device 3, which produces a data corresponding to an aperture size of a mounted interchangeable lens as set by the turning of an aperture control ring (not shown). The inputs of the analog switches AS10, AS11, AS12 and AS13 are connected, respectively, to 4 outputs of a focusing distance data producing device 4, which produces data corresponding to a focusing distance of a mounted interchangeable lens as set by the turning of a focusing distance control ring (not shown). The counter C08 has 2 outputs: one output is connected to one input of an OR gate OR10 and also to one inverting input of an AND gate AN30; and the other output is connected to the other inverting input of the AND gate AN30. The OR gate OR10 has an output which is connected through the terminal DS of the IC 2 to a gate terminal of each of the analog switches AS5, AS6, AS7 and AS8 and also to an input of an inverter IN2, provided externally of the IC 2. The output of the inverter IN2 is connected to a gate terminal of each of the analog switches AS10, AS11, AS12 and AS13.

By the above arrangement, the 4-bit signal applied from the preset counter C07 to the most significant 4 bit terminals of the data input terminal X1 of the multiplexer MP1 is used for specifying a region in the ROM RO1 where the data of focusing distance and aperture size of an interchangeable lens mounted on the camera body are stored. Furthermore, the 4-bit signal applied to the least significant 4 bit terminals of the data input terminal X1 of the multiplexer MP1 is used for specifying a location in the above-mentioned region where data of a particular focusing distance or an aperture size of an interchangeable lens mounted on the camera body is stored. Therefore, the 8-bit signal applied to the data input terminal X1 of the multiplexer MP1 serves as an address for specifying a particular focusing distance or a particular aperture size of a mounted interchangeable lens.

The ROM RO1 has 5 outputs for producing a 5-bit signal, and such 5 outputs are connected to 5 inputs of a shift register SR2. The shift register SR2 has an output for serially producing the 5-bit signal. The output of the register SR2 is connected to the output terminal J5 of the IC 2 and further to a shift register SR1 (FIG. 2) provided in the camera body through the terminal JB5. The shift register SR2 also has a clock terminal which is connected to the terminal J2 of the IC 2. The terminal J2 of the IC 2 is also connected to one input of each of AND gates AN28 and AN29. The other input of the AND gate AN28 is connected to the terminal T1 of the decoder DE3, and the other input of the AND gate AN29 is connected to the terminal T2 of the decoder DE3. The AND gate AN28 has an output connected to a set terminal of a flip-flop FF6 through a suitable capacitor, and the AND gate AN29 has an output connected to a reset terminal of the flip-flop FF6 through an OR gate OR4 and a suitable capacitor. A Q-terminal of the flip-flop FF6 is connected to a selection terminal SP of the shift register SR2. When the positive edge of the clock pulse CP produced during the Q-terminal of the flip-flop FF6 is producing a high level signal, the 5-bit signal produced from the ROM RO1 is applied to the shift register SR2 parallelly. Thereafter, in a synchronized relation with the positive edges of the clock pulses CP, the 5-bit signal is sent out serially from the shift register SR2 bit by bit from the most significant bit, and is applied to the shift register SR1 (FIG. 2) through analog switch AS2 and terminals J5 and JB5.

Of the 3 outputs from the counter CO6, the 2 outputs carrying the most and the least significant bits are connected to inverting inputs, respectively, of an AND gate AN25 and the remaining output is connected to non-inverting input of the AND gate AN25. The output of the AND gate AN25 is connected to a one-shot circuit OS6, which is in turn connected to a set terminal of a flip-flop FF4. The flip-flop FF4 has a Q-terminal connected to a D-terminal of a D flip-flop DF5. The D flip-flop DF5 has a clock terminal connected to the terminal T0 of the decoder DE3, and a Q-terminal connected to one input of an AND gate AN32. The D flip-flop DF5 further has a $\overline{Q}$-terminal which is connected to one input of an AND gate AN33. The other input of the AND gate AN32 and the inverting input of the AND gate AN33 are both connected to the terminal t0. The outputs of the AND gates AN32 and AN33 are connected, respectively, to 2 inputs of an OR gate OR11, and an output of the OR gate OR11 is connected to a gate terminal of the analog switch AS2.

The camera accessories mountable on the camera body are previously arranged such that the terminal t0 of the IC 2 produces a high level signal when the camera accessory mounted on the camera body is an interchangeable lens, and a low level signal when it is a lens adaptor, as indicated in Table 4. When the counter CO6 has counted clock pulses CP to produce a 3-bit signal "010", the AND gate AN25 produces a high level signal, thus setting the flip-flop FF4. Then, upon receipt of a high level signal from the terminal T0 of the decoder DE3, the D flip-flop DF5 produces a high level signal from its Q-terminal. In this case, if an interchangeable lens is mounted on the camera body, the terminal t0 produces a high level signal and, therefore, the AND gate AN32 produces a high level signal causing the turn on of the analog switch AS2. On the other hand, if a lens adaptor is mounted on the camera body, the terminal t0 produces a low level signal and, therefore, the AND gate AN32 produces a low level signal causing turn off of the analog switch AS2. When the counter CO6 is producing a 3-bit signal "000" or "001", the flip-flop FF4 produces a low level signal from its Q-terminal, and thus the D flip-flop DF5 produces a high level signal from its $\overline{Q}$-terminal. In this case, if a lens adaptor is mounted on the camera body, the AND gate AN33 produces a high level signal causing turn on of the analog switch AS2. On the other hand, if an interchangeable lens is mounted, the AND gate AN33 produces a low level signal causing turn off of the analog switch AS2.

As described above, the counter CO8 has 2 outputs which are connected, respectively, to 2 inverting inputs of the AND gate AN30. The output of the AND gate AN30 is connected to one input of an AND gate AN31. The other input of the AND gate AN31 is connected to a divider DI2 which receives clock pulses CP from the terminal J2 of the IC 2 and produces a pulsating signal having a frequency fn (such as 16 Hz). The output of the AND gate AN31 is connected to each of the other inputs of OR gate OR10, inverting input of AND gate AN34, and one input of AND gate AN35. The divider DI2 has another output for producing a pulsating signal having a frequency fn-1 (such as 32 Hz), and it is connected to the other input of the AND gate AN34 and also to the other input of the AND gate AN35. The AND gate AN34 has an output connected to a latch terminal of a register REG21, and the AND gate AN35 has an output connected to a latch terminal of a register REG20. Each of the registers REG20 and REG21 has 4 inputs connected to the terminals k0, k1, k2 and k3, respectively. The output from the register REG20 is connected through a terminal M to a display device DP1 provided externally of the IC 2 for displaying the aperture size set in the interchangeable lens, and the output from the register REG21 is connected through a terminal N to a display device DP2 provided externally of the IC 2 for displaying the focusing distance set in the interchangeable lens.

Figure 3A:
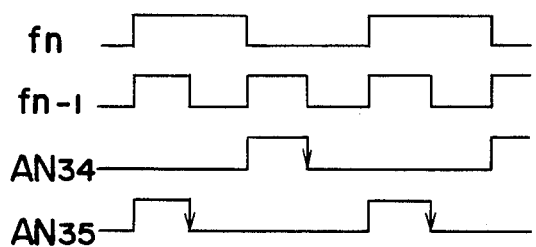
FIGS. 3($a$) and 3($b$) are graphs showing waveforms obtained from the circuit of FIG. 1.

During the period when data is not being transmitted from the interchangeable lens to the camera body, the counter CO8 produces a 2-bit signal "00" and, therefore, the AND gate AN30 produces a high level signal. In this case, the pulsating signal with the frequency fn from the divider DI2 is transmitted through the AND gate AN31 and terminal DS to each of the analog switches AS5, AS6, AS7 and AS8, causing a turn on of these analog switches when the pulsating signal is in a high level, thus transmitting the data from the aperture size data producing device 3 to the IC 2 through the terminals k0, k1, k2 and k3. The pulsating signal with the frequency fn is further transmitted through the inverter IN2 to each of the analog switches AS10, AS11, AS12 and AS13, causing a turn on of these analog switches when the pulsating signal from the inverter IN2 is in a high level (that is when the pulsating singal from the terminal DS is in a low level), thus transmitting the data from the focusing distance data producing device 4 to the IC 2. The data from the aperture size data producing device 3 appearing at the terminals k0 to k3 are latched in the register REG20 when the output signal from the AND gate AN35 changes from a high to a low level signal, i.e., when the pulsating signal with the frequency fn-1 from the divider DI2 changes to low level during the pulsating signal when the frequency fn from the divider DI2 is in high a level. This relation is shown in FIG. 3(a). Furthermore, the data from the focusing distance data producing device 4 appearing at the terminals k0 to k3 are latched in the register REG21 when the output signal from the AND gate AN34 changes from high to low, i.e., when the pulsating signal with the frequency fn-1 from the divider DI2 changes to low level during the pulsating singal of frequency fn from the divider DI2 is in low level. For the display of the data, the aperture size data latched in the register REG20 are fed to the display device DP1, and the focusing distance data latched in the register REG21 are fed to the display device DP2.

Referring to FIG. 2, the shift register SR1, which receives read out data in a serial form from the terminal JB5, has 5 outputs which are connected to inputs of a register REG1. The output of the register REG1 is connected to the data input terminal of each of 9 registers REG2, REG3, REG4, REG5, REG6, REG7, REG8, REG9 and REG10. The shift register SR1 further has a clock terminal connected to the pulse generator PG for receiving the clock pulses CP, and the register REG1 further has a latch terminal connected to the terminal TB0 of the decoder DE1. The register REG2 receives a check code "11100" for checking whether a lens adaptor is properly mounted on the camera body or not. A timing means for applying such a check code "11100" to the register REG2, as well as a timing means for applying various data to each of the registers REG3 to REG10, will be described later. The register REG2 has 5 outputs in which 3 outputs from the most significant bit are connected to 3 noninverting inputs of an AND gate AN15 and 2 remaining outputs are connected to 2 inverting inputs of the AND gate AN15. The AND gate AN15 has an output connected to a control circuit (not shown) and/or a display circuit (not shown) provided in the camera body. The register REG3 receives a data representing the type of lens adaptor mounted on the camera body, and its output is connected to a control circuit (not shown) and/or a display circuit (not shown) provided in the camera body.

The register REG4 receives a check code "11100" for checking whether an interchangeable lens is properly mounted on the camera body or not. The register REG2 has 5 outputs in which 3 outputs from the most significant bit are connected to 3 non-inverting inputs of an AND gate AN16 and 2 remaining outputs are connected to 2 inverting inputs of the AND gate AN16. The AND gate AN16 has an output connected to an inverting input of an AND gate AN17. The AND gate AN17 further has 2 non-inverting inputs which are connected to a terminal d2 of a decoder DE2 and the terminal TB2 of the decoder DE1. An output of the AND gate AN17 is connected to one input of an OR gate OR3. The register REG5 receives a data code representing a maximum aperture size of a mounted interchangeable lens, and the register REG6 receives a data code representing a minimum aperture size of a mounted interchangeable lens. The register REG7 receives a data code representing a focal length of a mounted interchangeable lens, and the register REG8 receives a data code representing a distance between principal points. Furthermore, the register REG9 receives a data code representing a distance corresponding to a degree of turn of a focusing ring of a mounted interchangeable lens, and the register REG10 receives a data code representing an aperture size corresponding to the number of steps reduced down by the turn of an aperture control ring of a mounted interchangeable lens. The outputs from the registers REG5, REG6, REG7, REG8, REG9 and REG10 are connected to a control circuit (not shown) and/or a display circuit (not shown) provided in the camera body.

The counter CO2 has a clock terminal connected to the terminal TB7 of the decoder DE1, and a reset terminal connected to the Q-terminal of the flip-flop FF1. Furthermore, the counter CO2 has 4 outputs which are connected to 4 inputs, respectively, of a decoder DE2. The decoder DE2 has 9 outputs d0, d1, d2, d3, d4, d5, d6, d7 and d8 in which: output d0 is connected to one input of an AND gate AN3; output d1 is connected to one input of an AND gate AN4; output d2 is connected to one input of an AND gate AN5; output d3 is connected to one input of an AND gate AN6; output d4 is connected to one input of an AND gate AN7; output d5 is connected to one input of an AND gate AN8; output d6 is connected to one input of an AND gate AN9; output d7 is connected to one input of an AND gate AN10; and output d8 is connected to one input of an AND gate AN11. The other inputs of the AND gates AN3, AN4, AN5, AN6, AN7, AN8, AN9, AN10 and AN11 are connected with each other and further to the terminal TB1 of the decoder DE1. The outputs of the AND gates AN3, AN4, AN5, AN6, AN7, AN8, AN9, AN10 and AN11 are connected, respectively, to latch terminals of the registers REG2, REG3, REG4, REG5, REG6, REG7, REG8, REG9 and REG10.

The output terminal d8 of the decoder DE2 is also connected to one input of an AND gate AN21. The other input of the AND gate AN21 is connected to the terminal TB2 of the decoder DE1. The output of the AND gate AN21 is connected to the other input of the OR gate OR3, and an output of the OR gate OR3 is connected to the other input of the OR gate OR2. The output of the OR gate OR2 is connected to a reset terminal of the flip-flop FF1. When the AND gate AN11 receives the timing pulse from the terminal d8 of the decoder DE2, the register REG10 receives data from the register REG1, thus completing the data reading. Then, by a next timing pulse from the terminal TB2, the AND gate AN21 produces a high level signal which is applied through the OR gates OR3 and OR2 to the reset terminal R of the flip-flop FF1, causing the flip-flop FF1 to produce a low level signal from its Q-terminal, thereby to stop producing the start signal, which effects the data reading.

Next, the operation of the circuit of FIGS. 1 and 2 is described.

When the light measuring switch S1, shown in FIG. 2, turns on, the transistor BT1 conducts to supply electric power +V to control circuit (not shown) and display circuit (not shown) through a power supply line. An electric power +E is supplied to almost all of the circuits shown in FIGS. 1 and 2 from the battery BA all the time. In response to the supply of electric power +V, the power-on-reset circuit 1 generates a power-on-reset signal POR which resets each of flip-flop FF1, registers REG2 to REG10, D flip-flop DF1 and divider DI1. Also, by the turning on of the light measuring switch S1, the inverter IN1 produces a high level signal, and then, by a positive edge of a clock pulse from the pulse generator PG, the D flip-flop DF1 produces a high level signal from its Q-terminal. The high level signal from the D flip-flop DF1 enables the AND gate AN1 to transmit the clock pulses from the pulse generator PG to the divider DI1 and, at the same time, it actuates the one-shot circuit OS1 to produce a single positive going pulse. The pulse from the one-shot circuit OS1 is applied through OR gate OR1 to flip-flop FF1. Thus, the flip-flop FF1 is turned to a set condition, producing a high level signal from its Q-terminal. This high level signal from the Q-terminal of flip-flop FF1 is applied to the circuit of FIG. 2 installed in the camera body and the circuit of FIG. 1 installed in the mounted accessory, such as an interchangeable lens or a lens accessory, and it serves as a start signal that starts the operation of data reading.

The start signal enables the AND gate AN2, releases the counters CO1 and CO2 from the reset condition, and turns the decoders DE1 and DE2 to a condition ready to produce an output. When a camera body is mounted with an interchangeable lens or a lens adaptor installed with the IC 2 of FIG. 1, the start signal is further applied to the IC 2 through the terminal J3. Thus, the start signal releases the counters CO3, CO6 and CO8 and D flip-flops DF5 and DF6 from the reset condition and, at the same time, it turns the decoder DE3 and the ROM RO1 to a condition ready to produce output. And, by a pulse produced from the one-shot circuit OS5, flip-flops FF4, FF5 and FF6 are turned to a reset condition.

The description hereinbelow is directed to a case when an accessory mounted on the camera body is a lens adaptor I, e.g., a bellows having a linkage for automatic aperture control. In this case, none of the terminals t3, t2, t1 and t0 of the IC 2 is connected to the power source +E and, therefore, the accessory type code producing means produces an accessory type code "0000" and, thus, the decoder DE5 produces, as shown in Table 4, a 5-bit data "00000" which is applied to the multiplexer MP1 at the most significant 5-bits of the input X2. When the start signal is applied from the camera body to the IC 2 through the terminal J3, the D flip-flop DF5 is released from the reset condition and, at the same time, the one-shot circuit OS5 produces a pulse for turning the flip-flop FF4 to a reset condition. At this moment, the $\overline{Q}$-terminal of the D flip-flop DF5 is producing a high level signal. Since the terminal t0 is producing a low level signal, the AND gate AN33 and the OR gate OR11 produces a high level signal, thereby turning the analog switch AS2 to an on state.

In other words, when the lens adaptor I, or any other lens adaptor, is mounted on the camera, the terminal t0 produces a low level signal (Table 4) to permit the transmission of data from the ROM RO1 through the analog switch AS2 during the time the D flip-flop DF5 is producing a high level signal from its Q-terminal.

On the contrary, when an interchangeable lens is mounted on the camera, the terminal t0 produces a high level signal (Table 4) to permit the transmission of data from the ROM RO1 through the analog switch AS2 during the period that the D flip-flop DF5 is producing a high level signal from its Q-terminal.

Figure 3B:
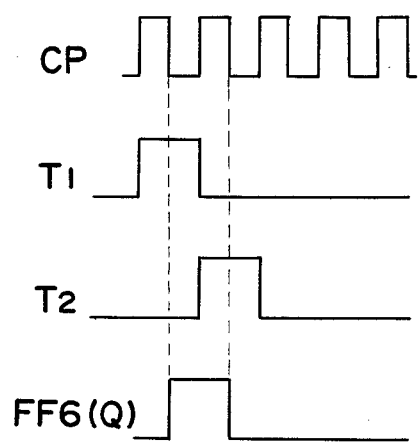

Upon receipt of the start signal, the counter CO3 starts to count clock pulses CP in a synchronized relation with the counting operation carried out by the counter CO1 provided in the camera body, and the decoder DE3 produces timing pulses from its terminals T0 to T7 as the counter CO3 counts up, in a manner shown in Table 3. The counter CO6 receives and counts the timing pulses from the terminal T1 of the decoder DE3 and, when it has counted one timing pulse, it produces a 3-bit signal "001". This 3-bit signal "001" is applied to the data input terminal X2 of the multiplexer MP1 at the least significant 3-bits. At this moment, since the D flip-flop DF6 is producing a low level signal from its Q-terminal, the multiplexer MP1 selects signal "00000001" applied to the data input terminal X2 and produces the selected signal "00000001" from its outputs to the ROM RO1 as an address. By the address signal "00000001", a particular location in the ROM RO1 is specified and data stored in the particular location is read out. According to the example given in Table 1, a data "11100" is stored in the specified particular location, and it is shifted to the shift register SR2 parallelly at the same time in response to a pulse produced from the Q-terminal of the flip-flop FF6. The flip-flop FF6 is turned to a set condition in response to a negative edge of a clock pulse CP which has been transmitted through the AND gate AN28 enabled by the timing pulse from the terminal T1 of the decoder DE3, and is turned to a reset condition in response to a negative edge of a clock pulse CP which has been transmitted through the AND gate AN29 enabled by the timing pulse from the terminal T2 of the decoder DE3, as shown by waveforms of FIG. 3(b). Thus, the Q-terminal of the flip-flop FF6 produces a high level signal for a period of time from the negative edge of a clock pulse produced during the time the terminal T1 is producing a high level signal until the negative edge of a clock pulse produced from the terminal T2 produces a high level signal. Then, by a positive edge of a clock pulse CP produced during the time the Q-terminal of the FF6 is producing a high level signal, i.e., at the positive edge of a signal from the terminal T2, the 5 bits of data from the ROM RO1 are transmitted at once parallelly to the shift register SR2. Thereafter, the 5 bits of data are taken out from the shift register bit by bit from the most significant bit in a synchronized relation with positive edges of a train of clock pulses CP, and are applied to the shift register SR1 in the camera body through analog switch AS2, and terminals J5 and JB5. The shift register SR1 takes in the data from the terminal JB5 in a synchronized relationship with the negative edges of a train of clock pulses CP. The transmitted data is a 5-bit data, and this data is sequentially transmitted from the shift register SR2 in response to the positive edge of the timing pulse from the terminal T3 of the decoder DE3, and is sequentially applied to the shift register SR1 in response to the negative edges of clock pulses produced during the time the terminal TB3 of the decoder DE1 is producing a high level signal. The reading of one data on the camera side is completed at the moment a negative edge of a clock pulse produced during the time the terminal TB7 of the decoder DE1 is producing a high level signal. Thereafter, in response to the positive edge of the next timing pulse produced from the terminal TB0 of the decoder DE1, the 5-bits of data from the shift register SR1 are transmitted parallelly to the register REG1 and are latched therein. A relationship between the outputs of the counter CO2 to be applied to the decoder DE2 and the outputs of the decoder DE2 from its terminals d0 to d8 is shown in Table 5 below.

TABLE 5

| Counter CO2 | Decoder DE2 | | | | | | | | |
|---|---|---|---|---|---|---|---|---|---|
| | d0 | d1 | d2 | d3 | d4 | d5 | d6 | d7 | d8 |
| 0 0 0 0 | L | L | L | L | L | L | L | L | L |
| 0 0 0 1 | H | L | L | L | L | L | L | L | L |
| 0 0 1 0 | L | H | L | L | L | L | L | L | L |
| 0 0 1 1 | L | L | H | L | L | L | L | L | L |
| 0 1 0 0 | L | L | L | H | L | L | L | L | L |
| 0 1 0 1 | L | L | L | L | H | L | L | L | L |
| 0 1 1 0 | L | L | L | L | L | H | L | L | L |
| 0 1 1 1 | L | L | L | L | L | L | H | L | L |
| 1 0 0 0 | L | L | L | L | L | L | L | H | L |
| 1 0 0 1 | L | L | L | L | L | L | L | L | H |

The counter CO2 counts up by one each time it receives the positive edge of the timing signal from the terminal TB7 of the decoder DE1. Therefore, at a moment when a check code "11100" is latched in the register REG1 in response to the positive edge of the timing pulse from the terminal TB0 of the decoder DE1, the counter CO2 is producing "0001" and, therefore, the terminal d0 of the decoder DE2 is producing a high level signal (see Table 5). Then, when a latch terminal L of the register REG2 receives the positive edge of a timing pulse from the terminal TB1 of the decoder DE1 through the AND gate AN3, the data from the register REG1 is latched in the register REG2. Then, the output from the register REG2 is determined whether it is "11100", or not, by the AND gate AN15. When the lens accessory is properly mounted on the camera body, i.e., when the data latched in the register REG2 is "11100", the AND gate AN15 produces a high level signal. Contrary, when the lens accessory is not properly mounted on the camera body, or when no lens accessory is mounted on the camera body, the AND gate AN15 produces a low level signal.

Then, by the next positive edge of a timing pulse from the terminal T1 of the decoder DE3, shown in FIG. 1, the counter CO6 produces an output "010" and, therefore, the address for the ROM RO1 becomes "00000010". Thus, the ROM RO1 produces an output which indicates the type of lens adaptor I. As has been described above, it is previously determined that the lens adaptor I is a bellows having a link mechanism for an auto-control aperture and for the indication of such a type of lens adaptor, the data code read out from the ROM RO1 is "00001". The read out code is then latched in the register REG1 in response to the step up of the pulse from the terminal TB0 of the decoder DE1. At this moment, the output from the counter CO2 is "0010", and the output from the terminal d1 of the decoder DE2 a high level signal, as shown in Table 5. Therefore, the data stored in the register REG1 is latched in the register REG3.

Then, in FIG. 1, when the output from the counter CO6 becomes "010", the AND gate AN25 produces a high level signal and, therefore, the one-shot circuit OS6 produces a positive going pulse, turning the flip-flop FF4 to a set condition. Then, after the completion of transmission of data that indicates the type of lens adaptor I, i.e., at a positive edge of a next timing pulse from the terminal T0 of the decoder DE3, the data flip-flop DF5 takes the data at the D terminal and, in turn, it produces a low level signal from its $\overline{Q}$-terminal. In the case of a lens adaptor, the output from the terminal t0 of the IC 2 is a low level signal and, therefore, the analog switch AS2 is turned off to stop the transmission of data from the lens adaptor to the camera body.

Next, the description is directed to a case when the camera accessory to be mounted on the camera body is an interchangeable lens I. In this case, only the terminal t0 of the IC 2 is connected to the power +E and, other terminals t1, t2 and t3 are connected to ground. Therefore, the terminals t0, t1, t2 and t3 altogether produce a 4-bit signal "0001" which indicates that the type of accessory mounted on the camera is an interchangeable lens I. The signal "0001" from the terminals t3, t2, t1 and t0 is applied to the decoder DE4 which then produces a 4-bit signal "0000" from its outputs e0, e1, e2 and e3, as shown in Table 4. And, at the same time, the signal "000" from the terminals t3, t2 and t1 is applied to the decoder DE5 which then produces a 5-bit signal "00000" from its outputs f0, f1, f2, f3 and f4, as shown in Table 4. And, in response to the positive edge of the start signal from the terminal J3, the preset counter CO7 is preset to receive and hold data "0000" from the decoder DE4 and, at the same time, the counter CO8 is released from the reset condition.

When the output from the counter CO6 becomes "010", the AND gate AN25 produces a high level signal. Thus, the one-shot circuit OS6 produces a positive going pulse which is applied to the flip-flop FF4 for resetting the same. Thus, the Q-terminal of the flip-flop FF4 produces a high level signal which is applied to the data input of the D flip-flop DF5. Thereafter, when the D flop-flop DF5 receives a timing pulse from the terminal T0 of decoder DE3 to its clock terminal CL, the D flip-flop DF5 produces a high level signal from its Q-terminal. At this moment, since the terminal t0 is producing a high level signal, the high level signal from the Q-terminal of the D flip-flop DF5 is transmitted through the AND gate AN32 and the OR gate OR11 to the analog switch AS2. Thus, the analog switch AS2 is turned to a conductive state to permit the transmission of data in ROM RO1 from the accessory side to the camera side, i.e., from the shift register SR2 to the shift register SR1 through the terminals J5 and JB5. Thereafter, by a timing pulse produced from the terminal T1 of the decoder DE3, the output of the counter CO6 turns to "011" and, therefore, the multiplexer MP1 receives a signal "00000011" to its input terminal X2, and this signal is applied to the ROM RO1 as an address data. Thus, the ROM RO1 produces a check code "11100" which is temporarily stored in the shift register SR2 by the positive edge of a timing pulse from the terminal T2 of the decoder DE3, in a manner described above. Thereafter, in response to the positive edges of clock pulses CP, the check code "11100" is sent out from the shift register SR2 bit-by-bit, through the analog switch AS2 and terminals J5 and JB5. And, in response to the negative edges of clock pulses CP, the check code "11100" is stored in the shift register SR1 (FIG. 2) bit-by-bit. Then, by a positive edge of a timing pulse TB0 from the decoder DE1, the register REG1 latches the check code "11100". Then, by a positive edge of a timing pulse TB1 from the decoder DE1, the AND gate AN5, which has been held in the enabled condition by a high level signal from the terminal d2 of the decoder DE2, produces a high level signal for latching the check code "11100" in the register REG4.

The data read in the register REG4 is discriminated whether it is "11100" or not by the AND gate AN16. When the data read in the register REG4 is not "11100", that is when the interchangeable lens I is not properly mounted on the camera, the AND gate AN16 produces a low level signal and, thus, the AND gate AN17 is enabled. Then, by the receipt of a timing pulse from the terminal TB2 of the decoder DE1, the AND gate AN17 produces a high level signal (end1) which is applied through the OR gates OR3 and OR2 to the flip-flop FF1. Thus, the flip-flop FF1 is turned to reset condition. On the contrary, when the data read in the register REG4 is "11100", that is when the interchangeable lens I is properly mounted on the camera, the AND gate AN16 produces a high level signal to maintain the AND gate AN17 in a disabled condition.

Thereafter, each time the counter CO6 receives a positive edge of a timing pulse from the terminal T1 of the decoder DE3, the output from the counter CO6 is changed in sequence of "100", "101", "110" and "111". Thus, the signal applied to the input terminal X2 of the multiplexer MP1 is sequentially changed in the order of "00000100", "00000101", "00000110" and "00000111", and these signals are applied one at a time to the ROM RO1 as address data. Thus, the ROM RO1 sequentially produces fixed data of the interchangeable lens I in the order of data of maximum aperture size, data of minimum aperture size, data of focal distance, and data of distance between principal points. These data are sequentially read in the registers REG5, REG6, REG7 and REG8 provided in the camera body in a similar manner described above.

In FIG. 1, when the counter CO6 produces "111", the AND gate AN26 produces a high level signal and, thus, the one-shot circuit OS7 produces a positive going pulse which sets the flip-flop FF6. Thus, the flip-flop FF5 supplies a high level signal to the data input of the D flip-flop DF6. Then, in response to the positive edge of a next timing pulse from the terminal T0 of the decoder DE3, the D flip-flop DF6 produces a high level signal from its Q-terminal for changing the state of the multiplexer MP1 to select signals from the input terminals X1 and, at the same time, for enabling the AND gate AN27. Then, by a next timing pulse from the terminal T1 of the decoder DE3, the AND gate AN27 produces a high level signal which is applied to the clock terminal of the counter CO7. Thus, the counter CO7, which has been preset to "0000" by the start signal, counts up by one, and produces "0001" from its outputs. The 4-bit signal "0001" from the counter CO7 is applied to the input terminal X1 of the multiplexer MP1 at the most significant 4 bit input terminals. The remaining or the least significant 4 bit signal to the input terminal X1 is applied from the terminals k3 to k0 in a manner described below.

After the D flip-flop DF6 produces a high level signal from its Q-terminal and when the AND gate AN27 produces a high level signal in response to the receipt of a timing pulse from the terminal T1 of the decoder DE3, the counter CO7 produces the 4-bit signal "0001" as described above, and, at the same time, the counter CO8 produces a 2-bit signal "01" from its outputs. Thus, each of the AND gates AN30 and AN31 and the OR gate OR10 produces a low level signal. Thus, the terminal DS of the IC 2 produces a low level signal, and the output of the externally provided inverter IN2 produces a high level signal. By the low level signal from the terminal DS, the analog switches AS5 to AS8 are turned off, and by the high level signal from the inverter IN2, the analog switches AS10 to AS13 are turned on. Thus, the terminals k3 to k0 receive data from the focusing distance data producing device 4, and the received data are applied to the least significant 4 bit terminals of the input terminal X1. Therefore, during the time the counter CO7 is producing the 4-bit signal "0001", the input terminal X1 receives an 8-bit signal which is between "00010000" and "00011111", or equal to "00010000" or "00011111", as an address for specifying a location in ROM RO1 where data of focusing distance for the interchangeable lens I is stored, as shown in Table 1. And, the specified data of focusing distance stored in the ROM RO1 is fed to the camera side and is stored in the register REG9 in a manner similar to that described above.

In FIG. 1, when the decoder DE3 produces the next timing pulse from its terminal T1, the counter CO7 produces a signal "0010" and the counter CO8 produces a signal "10". By the signal "10" from the counter CO8, the OR gate OR10 produces a high level signal. Thus, the terminal DS produces a high level signal, and the inverter IN2 produces a low level signal. By the high level signal from the terminal DS, the analog switches AS5 to AS8 are turned on. Thus, the terminals k3 to k0 receive data from the aperture size data producing device 3, and the received data are applied to the least significant 4 bit terminals of the input terminal X1. Therefore, during the time the counter CO7 is producing the 4-bit signal "0010", the input terminal X1 receives an 8-bit signal which is between "00100000" and "00101111", or equal to "00100000" or "00101111", as an address for specifying a location in ROM RO1 where data of aperture size of the interchangeable lens I is stored, as shown in Table 1. And, the specified data of aperture size stored in the ROM RO1 is fed to the camera side and is stored in the register REG10 in a manner similar to that described above.

When the register REG10 shown in FIG. 2 completes its reading of the aperture size data, and when the next timing pulse is produced from the terminal TB2 of the decoder DE2, the AND gate AN21 produces a high level signal (end2) which is applied to the OR gate OR3. Thus, the OR gate OR3 produces a high level signal (end) which is applied through the OR gate OR2 to the flip-flop FF1. The flip-flop FF1 is turned to a reset condition to produce a low level signal from its Q-terminal. Thus, the counters CO1 and CO2 are turned to a reset condition and, at the same time, the decoders DE1 and DE2 are turned to a condition unable to produce any timing pulses from their terminals. In a similar manner, the counters CO3, CO6 and CO8, and the D flip-flops DF5 and DF5, shown in FIG. 2, are turned to a reset condition, and the decoder DE3 and the ROM RO1 are turned to a condition unable to produce any signal from their outputs.

In FIG. 2, if the light measuring switch S1 is still held close even after the completion of reading data in all the registers REG2 to REG10, the D flip-flop DF1 continues to produce a high level signal from its Q-terminal and, therefore, the AND gate AN1 is enabled to continuously feed the clock pulses CP to the divider DI1. Thus, the divider DI1 produces, after counting a predetermined number of clock pulses CP, a pulse which effects the one-shot circuit OS2 to produce a positive going pulse. As long as the clock pulses CP are applied to the divider DI1, the divider DI1 continues to produce pulses having a very low frequency, for example, 4 Hz. The positive going pulse from the one-shot circuit OS2 is applied to the flip-flop FF1 through the OR gate OR1, thus, the flip-flop FF1 is again turned to a set condition to produce a high level signal (start signal) from its Q-terminal. Therefore, one cycle of operation of reading data of mounted accessory from the ROM RO1, and storing the read out data in each of the registers REG2 to REG10 is carried out again. And, so long as the divider DI1 continues to produce the pulses, i.e., so long as the light measuring switch S1 is turned on, the cycle of operation is repeated again and again in a frequency of 4 Hz.

In the case where it is necessary to read out more data, such as in the case when the mounted accessory is a zoom-lens and it is necessary to read out further data of focal length as set by the turning of the zoom-ring and data for correcting the aperture size, registers for holding further data should be provided in addition to the registers REG2 to REG10. In this case, when the last data to be read is stored in the last register, an end signal should be produced in response to the next timing pulse produced from the terminal TB2.

According to the embodiment described above, the data from the AND gates AN15 and AN16 and from the registers REG3 and REG5 to REG10 are used for controlling the operations of the camera body, such as shutter opening operation and display operation. Since these operations are not directly related to the present invention, the description therefor is omitted for the sake of brevity.

Next, the description hereinbelow is directed to a case when an accessory mounted on the camera body is a lens adaptor II, e.g., a reverse adaptor having a linkage for automatic aperture control. In this case, only the terminal t1 of the IC 2 is connected to the power source +E and, therefore, the accessory type code producing means produces an accessory type code "0010" and, thus, the decoder DE5 produces, as shown in Table 4, a 5-bit data "00001" which is applied to the multiplexer MP1 at the most significant 5-bits of the input X2. In this case, the multiplexer MP1 sequentially specifies addresses "00001001" and "00001010" to read out data of the lens adaptor II from the ROM RO1 and the read out data are sequentially sent to the camera side.

Next, when an accessory mounted on the camera body is an interchangeable lens II, the accessory type code producing means as defined by the terminals t3 to t0 produces a 4-bit signal "0011". In this case, the decoder DE4 produces "0010" and the decoder DE5 produces "00001". Thus, locations where fixed data of the interchangeable lens II are stored are specified in the ROM RO1 sequentially by addresses from "00001011" to "00001111", and, thereafter, since the counter CO7 is preset with a signal "0010", a location where data of focusing distance is stored is specified in the ROM RO1 by an address which is between "00110000" and "00111111" or equal to "00110000" or "00111111". Thereafter, a location where data of aperture size is stored is specified in the ROM RO1 by an address which is between "01000000" and "01001111" or equal to "01000000" or "01001111".

In a similar manner, the accessory type code producing means as defined by the terminals t3 to t0 produces a 4-bit signal as shown in Table 4 correspondingly to the mounted accessory, and the decoders DE4 and DE5 produce signals as shown in Table 4 correspondingly to the 4-bit signal produced from the terminals t3 to t0. By the signals produced from the decoders DE4 and DE5, addresses as shown in Table 1 for specifying locations in the ROM RO1 are established to read out necessary data of interchangeable lens or lens adaptor from the ROM RO1.

In the case where the light measuring switch S1 is held open to supply no data to the camera side, the divider DI2 produces a train of pulses having a frequency of 16 Hz from its terminal fn, and another train of pulses having a frequency of 32 Hz from its terminal fn-1. The pulses (32 Hz) from the terminal fn-1 is applied to the AND gates AN34 and 35. And, the pulses (16 Hz) from the terminal fn is applied to the AND gate AN31. In this case, since the counter CO8 is producing a signal "00" from its outputs, the AND gate AN30 produces a high level signal to enable the AND gate AN31. Thus, the pulses (16 Hz) from the terminal fn are applied through the OR gate OR10 to the terminal DS, and also to the AND gates AN34 and AN35. By the pulses (16 Hz) from the terminal DS, more particularly, by the high and low level signals of the pulses (16 Hz), the aperture size data from the aperture size data producing device 3 and the focusing distance data from the focusing distance data producing device 4 are alternately taken into the IC 2 through the terminals k3 to k0. Then, by the negative edge of a pulse produced from the AND gate AN35, as shown in FIG. 3(a), i.e., by the negative edge of a pulse from the terminal fn-1 during the time the pulse from the terminal fn is at a high level, the register REG20 latches the data of aperture size from the terminals k3 to k0. And, by the negative edge of a pulse produced from the AND gate AN34, as shown in FIG. 3(a), i.e., by the negative edge of a pulse from the terminal fn-1 during the time the pulse from the terminal fn is in low level, the register REG21 latches the data of focusing distance from the terminals k3 to k0. The data stored in the registers REG20 and REG21 are applied to the display device DP1 and DP2 for displaying the set aperture size and the focusing distance.

Next, the aperture size data producing device 3 and the focusing distance data producing device 4 are described.

Figure 4:
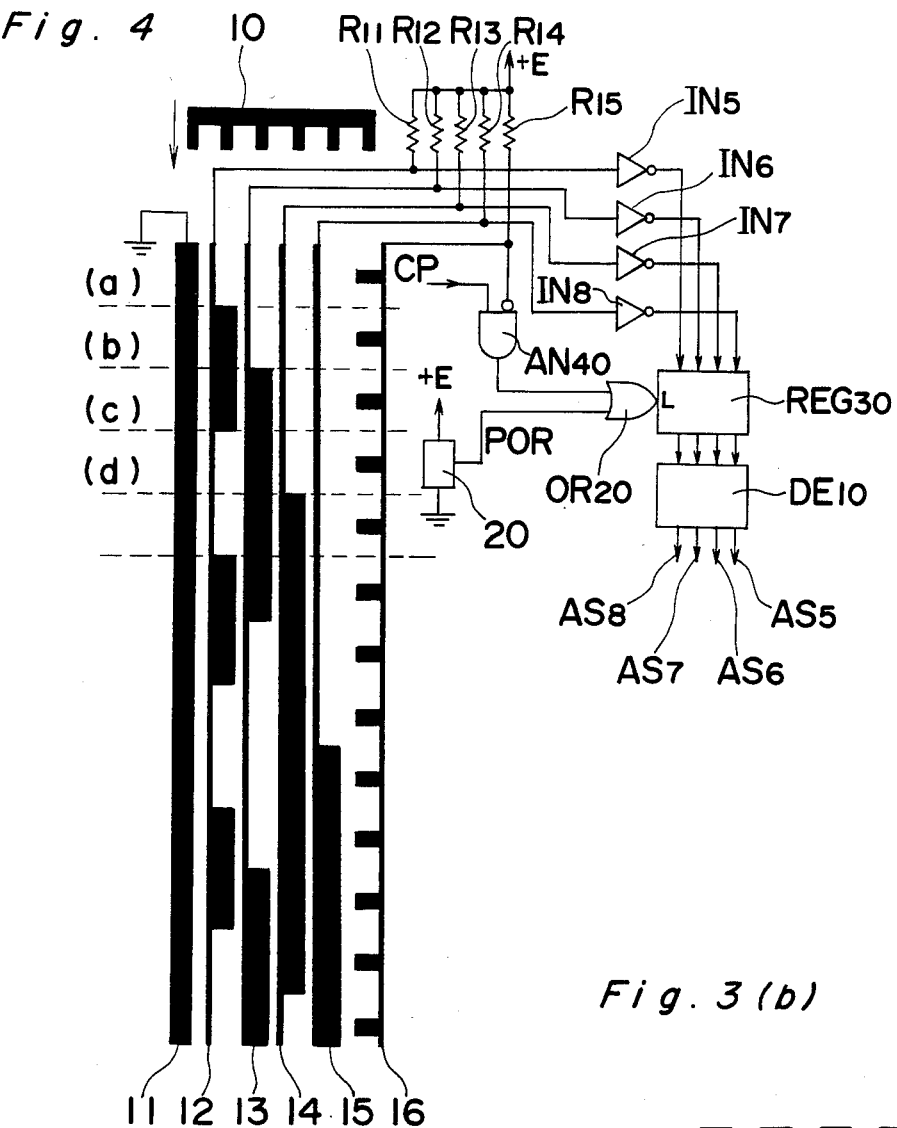
FIG. 4 is a circuit diagram showing one embodied form of an aperture size data producing device employed in the circuit of FIG. 1.

Referring to FIG. 4, the aperture size data producing device 3 has a segment 10 provided operatively in association with a ring (not shown), which is provided for controlling the aperture of an interchangeable lens. By the rotation of the aperture control ring, the segment 10 slides on ground electrode 11, code electrodes 12, 13, 14 and 15 and reference electrode 16. When an interchangeable lens is mounted on the camera body, the electrodes 12, 13, 14, 15 and 16 are connected to resistors R11, R12, R13, R15 and R15, respectively, and further to a power source +E (FIG. 2). The electrodes 12 to 15 are connectable to the ground electrode 11 through the segment 10. Thus, by the up and down movement, when viewed in FIG. 4, of the segment 10, gray code data is produced from the junctions between the code electrodes 12 to 15 and the resistors R11 to R14. The reference electrode 16 is so arranged that it is connected to the ground electrode 11 through the segment 10 when the segment 10 is moved to a position at the middle of each of code zones (a), (b), (c), etc, for producing gray codes. The electrodes 12, 13, 14 and 15 are also connected to inverters IN5, IN6, IN7 and IN8, respectively, and are in turn connected to 4 inputs of a register REG30. The reference electrode 16 is also connected to an inverting input of an AND gate AN40. The non-inverting input of the AND gate AN40 is connected to the pulse generator PG in the camera body through the terminals J2 and JB2. The output of the AND gate AN40 is connected to one input of an OR gate and, in turn, to a latch terminal of the register REG30. The other input of the OR gate OR20 is connected to an output of a power-on-reset circuit 20. The power-on-reset circuit 20 receives the power +E from the camera body through the terminals J1 and JB1. The 4 outputs of the register REG30 are connected to 4 inputs of a decoder DE10, and 4 outputs of the decoder DE10 are connected to the analog switches AS5, AS6, AS7 and AS8, respectively.

When the interchangeable lens is mounted on the camera body, the electric power +E is supplied to the power-on-reset circuit 20 through the terminal J1 of the IC 2. Thus, the power-on-reset circuit 20 produces a high level signal which serves as a power-on-reset signal (POR). In response to the power-on-reset signal (POR), the register REG30 latches the data of a gray code from the inverters IN5 to IN8. The gray code data latched in the register REG30 is applied to the decoder DE10 in which the gray code data is converted into binary code. The binary code is produced out of the decoder 10 through the analog switches AS5 to AS8 to the terminals k0 to k3.

When the segment 10 moves to change the zone, for example, from the zone (a) to the zone (b), the renewal of the gray code in the register REG30 is carried out in a manner described below. When the segment 10, during its movement from the zone (a) to zone (b), is disconnected from the reference electrode 16 in the zone (a), a signal on the electrode 16 changes from low to high and, therefore, the AND gate AN40 is turned to a disable condition. Thus, when the segment 10 is disconnected from the reference electrode 16, the register REG30 continues to hold the old data and refuses to receive any new data from the inverters IN5 to IN8.

Thus, the signal at the terminals k0 to k3 remains the same during the movement of the segment 10. When the segment 10 is moved to the center of the zone (b), it is connected with the reference electrode 16, resulting in an enabling of the AND gate AN40. Thus, the AND gate AN40 provides clock pulses to the latch terminal of the register REG30 to renew the data stored in the register REG30. Thus, the signal at the terminals k0 to k3 is renewed.

As has been described above, the renewal of the data is carried out only when the segment 10 is located in the center of each zone and, therefore, the data renewal can be carried out without any error, such as caused by an unstable connection of the segment to the edge of the code electrode. Therefore disadvantages, such as an unstableness of the image on the display device caused by the erroneous data taken into the register REG30 during the movement of the segment 10 over a boundary between zones can be eliminated.

Although FIG. 4 is particularly directed to the aperture size data producing device 3, the focusing distance data producing device 4 can be arranged in a similar manner by providing the segment 10 in association with a ring, which is provided for the control of focusing, and by connecting the outputs of the decoder DE10 to the analog switches AS10 to AS13.

It is to be noted that the shift register SR2 shown in FIG. 1 has 5 inputs and is so actuated to receive 5-bit data parallelly at once from the ROM RO1 in response to the positive edge of a timing pulse from the terminal T2. Then, by positive edges of the following timing pulses from the terminals T3 to T7, the shift register SR2 produces the data bit-by-bit towards the terminal J5. According to a preferred embodiment, the shift register SR2 as described above can be arranged by employing 6 flip-flops each having preset, set, input, and output terminals. The preset terminals of 5 flip-flops are connected to the 5 outputs of the ROM RO1, respectively, and the set terminals of 6 flip-flops are connected to the Q-terminal of the flip-flop FF6 for receiving the timing pulses. The output of the first flip-flop, which receives the least significant bit data from the ROM RO1, is connected to the input of the second flip-flop, which receives the second significant bit data from the ROM RO1. In this manner, the output of the second flip-flop is connected to the input of the third flip-flop, and the output of the third flip-flop is connected to the input of the fourth flip-flop, and so on. The output of the fifth flip-flop is connected to the input of the sixth flip-flop, and the output of the sixth flip-flop is connected to the analog switch AS2 and, in turn, to the terminal J5. By the above arrangement, the first to fifth flip-flops receive the data from the ROM RO1 at once by the timing pulse from the terminal T2, and with the delay of one timing pulse, the sixth flip-flop produces the data bit-by-bit sequentially in response to the timing pulses from the terminals T3 to T7.

Figure 5:
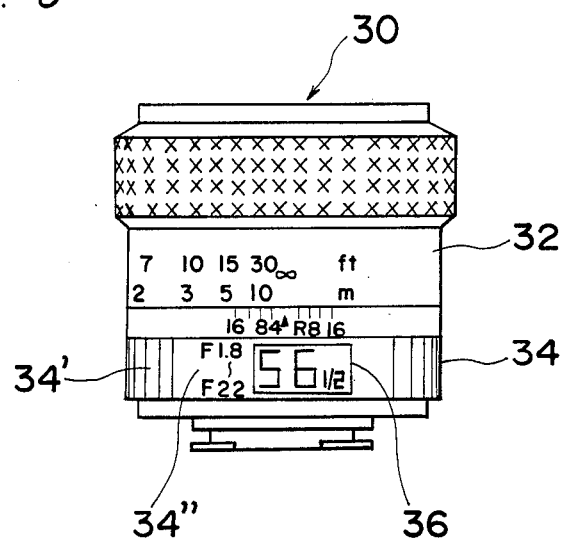
FIG. 5 is a side view of an interchangeable lens provided with a circuit of FIG. 1, and particularly showing a display device mounted in the interchangeable lens.

Referring to FIG. 5, an example of an interchangeable lens 30 is shown. The interchangeable lens 30 has a distance ring 32 for controlling the focusing distance and a aperture ring 34 for controlling the aperture size of the lens. A display element 36 is provided at a position on the aperture ring 34 and at a position capable of being viewed by a photographer with the lens mounted on the camera body, such as at a position viewable from the top, as shown in FIG. 5. In this case, in order to avoid the rotation of the display element 36 together with the rotation of the aperture ring 34, the aperture ring 34 is formed by a non-transparent portion 34' and transparent portion 34" having a relatively wide space, and the display element 36 is provided on a non-movable body behind the transparent portion 34" and is viewable through the transparent portion 34". The display element 36 is formed by two 7-segment elements, each having 7 segments arranged in a shaped of 日, a dot between two 7-segment elements for indicating, when it is lit, a decimal point, and a small character "178 " to show, when it is lit, a half.

Figure 6:
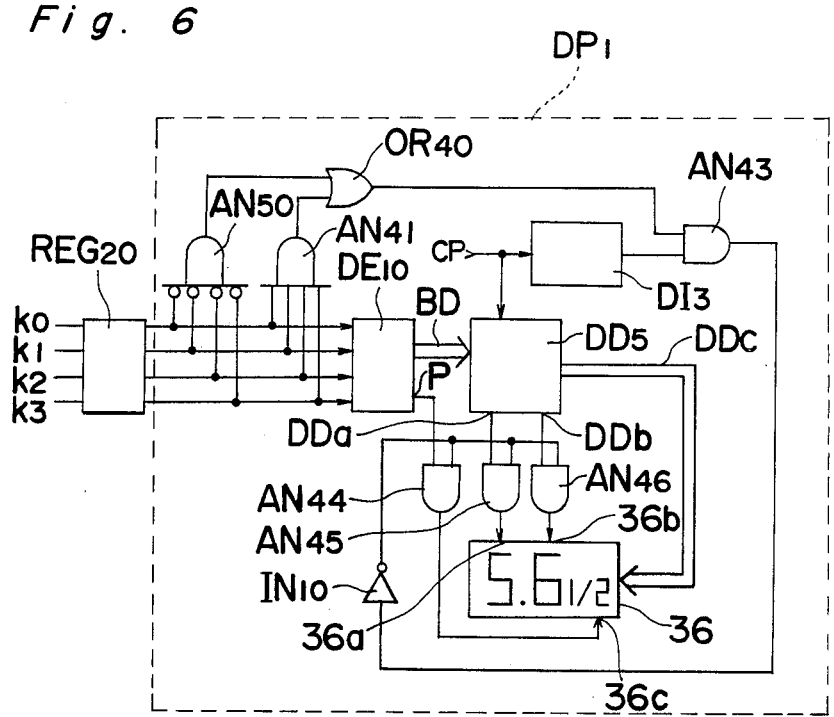
FIG. 6 is a circuit diagram showning one embodied form of an aperture size display device employed in the circuit of FIG. 1.

Referring to FIG. 6, a detailed circuit diagram of the display DP1 for the display of set aperture size of the interchangeable lens 30 as described above in connection with FIG. 1 is illustrated, and it includes the display element 36. As mentioned above, the register REG20 receives and stores the data of set aperture size from the aperture size data producing device 3, and provides the stored data to a decoder DE10, in which the data is converted to a BCD (binary coded decimal) data. The BCD data from the decoder DE10 is applied to a decoder driver DD5 in which the BCD data is further converted to data suitable for actuating the 7-segment elements. Accordingly, the decoder driver DD5 supplies a signal for driving the 7-segment elements from its terminal DDc, and a signal for driving digits from its terminals DDa and DDb in a time divided manner, to the display element 36. Also, a signal for driving the "$\frac{1}{2}$" character is applied to the display element 36 from the terminal P of the decoder DE10. By the above arrangement, the display DP1 displays numerals shown in Table 6 given later.

In the display DP1, 4 outputs of the register REG20 are connected to 4 inputs of the decoder DE10, and the output BD of the decoder DE10 is connected to the decoder driver DD5. Furthermore, 4 outputs of the register REG20 are also connected to 4 inverting inputs of an AND gate AN50 and also to 4 non-inverting inputs of an AND gate 41. The outputs of the AND gates AN50 and AN41 are connected to an OR gate OR40, and the output of the OR gate OR40 is connected to one input of an AND gate AN43.

The pulse generator PG (FIG. 2) also provides clock pulses CP to a divider DI3 and to the decoder driver DD5. The divider DI3 has an output connected to the other input of the AND gate AN43. The output of the AND gate AN43 is connected through an inverter IN10 to an input of each of AND gates AN44, AN45 and AN46. The other inputs of the AND gates AN45 and AN46 are connected, respectively, to the terminals DDa and DDb of the decoder driver DD5, and the other input of the AND gate AN44 is connected to the terminal P of the decoder DE10. The outputs of the AND gates AN44, AN45 and AN46 are connected, respectively, to inputs 36c, 36a and 36b of the display element 36.

The operation of the display DP1 is as follows. The data corresponding to the set aperture size and produced from the register REG20 is applied to the decoder DE10 in which the data is converted into a BCD form. The data in BCD form is applied from the decoder DE10 to the decoder driver DD5 in which the data is further converted to a form suitable for actuating the display element 36. When the data from the decoder driver DD5 is applied to the display element 36, the set aperture size is displayed numerically. When the set aperture size is intermediate between two given sizes, such as F-stop 2.0 and F-stop 2.8, the terminal P of the decoder DE10 produces a high level signal, and this signal is applied through the AND gate AN44 to the terminal 36c of the display element 36, whereby the display element 36 lights the character "½".

For example, when an interchangeable lens has an F-stop 1.8 for the maximum aperture size, and an F-stop 22 for the minimum aperture size, a relationship between the output of the register REG20 corresponding to the set aperture size and the output from the decoder DE10 is shown in Table 6 below.

TABLE 6

| REG20 | Digit above Decimal point | Decimal | Digit Below Decimal Point | P | Display |
|---|---|---|---|---|---|
| 0000 | 0001 | 1 | 1000 | 0 | 1.8 |
| 0001 | 0010 | 1 | 0000 | 0 | 2.0 |
| 0010 | 0010 | 1 | 0000 | 1 | 2.0½ |
| 0011 | 0010 | 1 | 1000 | 0 | 2.8 |
| 0100 | 0010 | 1 | 1000 | 1 | 2.8½ |
| 0101 | 0100 | 1 | 0000 | 0 | 4.0 |
| 0110 | 0100 | 1 | 0000 | 1 | 4.0½ |
| 0111 | 0101 | 1 | 0110 | 0 | 5.6 |
| 1000 | 0101 | 1 | 0110 | 1 | 5.6½ |
| 1001 | 1000 | 1 | 0000 | 0 | 8.0 |
| 1010 | 1000 | 1 | 0000 | 1 | 8.0½ |
| 1011 | 0001 | 0 | 0001 | 0 | 11 |
| 1100 | 0001 | 0 | 0001 | 1 | 11½ |
| 1101 | 0001 | 0 | 0110 | 0 | 16 |
| 1110 | 0001 | 0 | 0110 | 1 | 16½ |
| 1111 | 0010 | 0 | 0010 | 0 | 22 |

For example, when the set aperture size is F-stop 5.6, the decoder DE10 produces a data "0101101100", and when the set aperture size is between F-stop 5.6 and F-stop 8, i.e., F-stop 5.6½, the decoder DE10 produces a data "0101101101".

When the set aperture size is F-stop 1.8, the output from the register REG20 is "0000" and, therefore, the AND gate AN50 produces a high level signal. And, when the set aperture size is F-stop 22, the output from the register REG20 is "1111" and, therefore, the AND gate AN41 produces a high level signal. In either case, the OR gate OR40 produces a high level signal for enabling the AND gate AN43. Thus, a train of pulses from the divider DI3 is applied through the inverter IN10 to the AND gates AN44, AN45 and AN46. Thus, each of the AND gates AN44, AN45 and AN46 alternately produce high and low level signals, thereby causing blinking of the numeral displayed through the display element 36. Such a blinking indicates that the set aperture size is a maximum or minimum available size.

Figure 7:
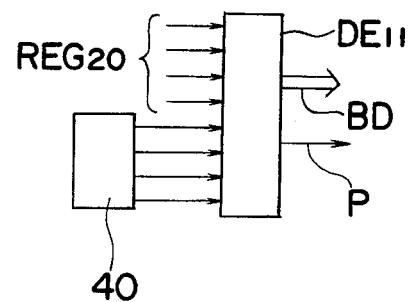
FIG. 7 is a block diagram showning a major portion of another embodied form of the aperture size display device.

In the case where the interchangeable lens is a zoom lens, there is a problem in that the actual aperture size may change from the set aperture size with respect to the change of focal length. For this type of zoom lens, the display of the aperture size can be carried out with the use of a circuit shown in FIG. 7. In FIG. 7, a decoder 11 is provided, which receives data corresponding to the set aperture size from the register REG20 and data corresponding to the focal length of the lens from a data output circuit 40. In the decoder DE11, the set aperture size data is corrected by increasing the F-stop number by a half or one step relatively to the degree of change in the focal length from the shortest focal length. The corrected aperture size data is produced from the decoder DE11 and is applied to the the decoder driver DD5 shown in FIG. 6. Therefore, with the use of the circuit of FIG. 7, the deviated F-stop number, which is the actual F-stop number, as caused by the change of focal length can be displayed through the display element 36 (FIG. 6).

Figure 8:
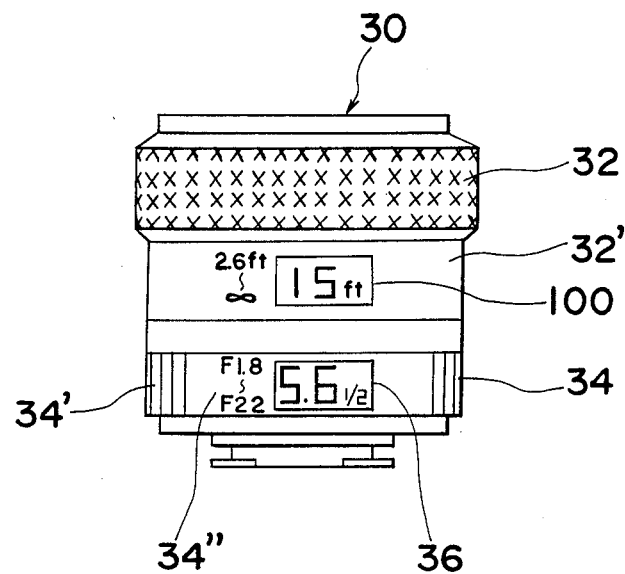
FIG. 8 is a view similar to FIG. 5, but particularly showing a modification thereof.

Referring to FIG. 8, an example of an interchangeable lens 30 provided with the display DP2 for displaying the focusing distance is shown. The lens 30 shown in FIG. 8 includes a display element 100 for displaying the focusing distance electrically and numerically, and the display element 100 is provided on a non-movable body behind a transparent portion 32' of the distance ring 32.

According to the prior art, an interchangeable lens employs an electronic circuit, through which various data related to the lens (such as focal length, distance between principal points, focusing distance, etc.) are transmitted electrically to the camera body. And, in the camera body, the received data are used for controlling the operation of the camera itself or for the display of data through display means provided in the camera body. However, the indication of set aperture size on the interchangeable lens, even with the interchangeable lens with the electronic circuit, is carried out by a scale with markings of F-stop numbers, such as 1.4, 2, 2.8, .. ., 16 etc. on a non-movable body of the lens and an arrow provided on a aperture ring for pointing to a spot on the scale. Since all the markings of F-stop numbers must be included in a restricted space determined by the degree of rotation of the aperture ring, the size of the markings has to be very small, resulting in a difficult reading, particularly when it is viewed in in a dark place. Furthermore, when the arrow points intermediately between two markings where only a dot or the like is provided, it is difficult to know such an intermediate value by a glance to the scale.

In contrast to the above, according to the preferred embodiment of the present invention, the set aperture size is numerically displayed on the interchangeable lens and, therefore, the above described difficulties can be eliminated and facilitating the reading of aperture size.

According to the embodiment described above, the ROM RO1 has a number of regions each storing data related to a particular accessory. Also, several bits from the most significant bit in the address code, designating the accessory type, are used to specify a particular region in the ROM RO1, while the remaining bits are used to specify a particular location in the specified region. Alternatively, it is also possible to arrange to use several bits from the least significant bit in the address code to specify a particular region in the ROM RO1. In this case, the data in ROM are classified by the type of data (such as maximum aperture size, minimum aperture size, focal length, etc.), and each type of data occupies a particular region in the ROM.

According to the embodiment described above, the start signal is sent from the camera body through the terminals JB3 and J3 to the accessory, and the electric power +E is always supplied to the accessory through the terminals JB1 and J1. In contrast to the above, it is possible to supply the electric power +E to the accessory only when the data read out operations are carried out. Furthermore a circuit for producing a signal (such as a power-on-reset signal) in response to the supply of electric power may be provided in the accessory, and by this signal, it is possible to start the data read out operations. In this case, it is possible to eliminate the terminals J3 and JB3.

Also, according to the embodiment described above, the address data for specifying the ROM are all prepared in the IC 2 in the accessory. Contrary, it is possible to provide some part of each address data, for example a part of address data other than that obtained from the accessory type code producing means as defined by the terminals t3 to t0, from the camera side.

According to the embodiment described above, although the camera accessory has been described as including interchangeable lenses and lens adaptors, it is possible to include other accessories mountable on the camera body, such as an electronic flash light device which provides data of light amount, and a motor drive device which provides data of the frequency of a sequential photographing operation. In this case, the electronic flash light device may provide, for example, data of maximum amount of light to be emitted, minimum amount of light to be emitted, and the set amount of light to be emitted, to the camera side.

Furthermore, in the embodiment described above, the circuit 2, which has been described as including circuit elements, such as flip-flops, registers, etc., can be formed by a single chip element, such as a microprocessor, so as to control the data output device of the present invention sequentially.

As has been described fully above, since the ROM, according to the present invention, is previously stored with various data related to various camera accessories, such as interchangeable lenses and lens adaptors, the ROM and its associated circuit for effecting the data read out can be provided to any type of the camera accessory without any change. Accordingly, the ROM itself and its associated circuit can be manufactured at a low cost, and thus, the camera accessories can be manufactured at a low cost.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A camera accessory capable of transmitting data to a camera comprising:
   a read only memory for storing various data at a plurality of addresses, respectively, the data including a group related to said camera accessory and other groups unrelated to said camera accessory, but related to other camera accessories;
   means for providing a code signal identifying said camera accessory;
   means for receiving a digital signal from said camera; and
   means responsive to said code signal and said digital signal for controlling a data transmission from said camera accessory to said camera so that only the data of said group related to said camera accessory are transmitted to said camera,
   whereby said read only memory serves as a general element common to said camera accessory and said other camera accessories.

2. The camera accessory according to claim 1, wherein said controlling means includes means responsive to said code signal and said digital signal for sequentially selecting the addresses of said read only memory at which the data of said group related to said camera accessory are stored, respectively.

3. The camera accessory according to claim 2, wherein said address selecting means includes first means responsive to said code signal for specifying a part of an address and second means responsive to said digital signal for specifying the remaining part of the address to complete one specific address.

4. The camera accessory according to claim 3, wherein said digital signal corresponds to a train of clock pulses, and said second specifying means includes means for counting said clock pulses to form said remaining part of the address.

5. The camera accessory according to claim 1 further comprising means for generating a digital code in response to a manual operation, wherein said controlling means is further responsive to said digital code for controlling the data transmission to said camera.

6. The camera accessory according to claim 1, wherein said controlling means includes means for preventing the data of said other groups unrelated to said camera accessory from being transmitted to the camera.

7. The camera accessory according to claim 1, wherein said camera accessory consists of an interchangeable lens barrel.

8. The camera accessory according to claim 1, wherein said camera accessory consists of a lens adapter.

9. The camera accessory according to claim 1 further comprising means for generating a digital code in response to a manual operation to select among various values for information to be set for photography, wherein said data stored in said read only memory includes data corresponding to said values for the information, respectively, and said controlling means is further responsive to said digital code for designating an address, at which data corresponding to a specific value selected by the manual operation is stored, to transmit said data stored in the designated address to said camera, and wherein said camera accessory further comprises a digital display for indicating the specific value corresponding to said data to be transmitted to the camera.

10. A camera accessory capable of transmitting data to a camera comprising:
    means for generating a digital code in response to a manual operation to select among various values for information to be set for photography;
    a read only memory for storing various data at a plurality of address, respectively, the data including data corresponding to said values for the information, respectively;
    means for receiving a digital signal from said camera;
    means responsive to said digital code and said digital signal for controlling a data transmission from said camera accessory to said camera, said controlling means including means for designating an address, at which a data corresponding to a specific value selected by the manual operation is stored, to transmit said data stored in the designated address to said camera; and
    a digital display for indicating, at said camera accessory, the specific value for the information corresponding to said data to be transmitted to the camera.

11. The camera accessory according to claim 10, wherein said camera accessory consists of an interchangeable lens barrel.

12. The camera accessory according to claim 11, wherein said information corresponds to the aperture value.

13. The camera accessory according to claim 11, wherein said information corresponds to the distance to an object.

14. The camera accessory according to claim 10 further comprising terminals for receiving an electric energy from said camera to power said generating means and said digital display.

15. The camera accessory according to claim 10 further comprising means for controlling said digital display so as to flicker the indication when the specific value selected by the manual operation is at the limit of possible values for the information.

16. An interchangeable lens barrel capable of transmitting data to a camera comprising:
  means for generating a digital code in response to a manual operation to select among various values for information to be set for photography, said digital code being indicative of a specific value for the information selected by the manual operation;
  a digital display responsive to data corresponding to said digital code for indicating, at said interchangeable lens barrel, the specific value for the information selected by the manual operation; and
  means for transmitting to said camera data corresponding to said digital code representative of the specific value for the information.

17. A camera accessory that effects the operation of a camera body during photography by inputting certain informational data about the accessory to the camera body for corresponding adjustment of the camera body operation, comprising:
  an accessory housing member;
  a read only memory having a plurality of distinct groups of data at a plurality of addresses, each group of data relating to an accessory compatible with the camera body including distinct groups of data that are not relevant to the specific accessory housing member supporting the read only memory;
  means for identifying the camera accessory to the camera body, and
  means for controlling a transmission of data from the camera accessory to the camera body in response to the means for identification so that only that distinct group of data relevant to the specific accessory is operatively transmitted to the camera body, whereby the read only memory can serve as a common element to not only the specific accessory but to other compatible accessories.

18. The invention of claim 17 further including means for enabling the transmission of data to the camera body only when the accessory is properly mounted on the camera body.

19. The invention of claim 18 wherein the accessory is an interchangeable lens barrel.

20. The invention of claim 19 further including a light measuring switch on the camera body and means to implement transmission of data from the interchangeable lens accessory to the camera body when the light measuring switch is activated.

* * * * *